United States Patent
Ropel et al.

(10) Patent No.: US 12,344,116 B2
(45) Date of Patent: *Jul. 1, 2025

(54) MESSAGING FOR TARGETED BATTERY UNIT DEGREDATION

(71) Applicant: Volvo Car Corporation, Gothenburg (SE)

(72) Inventors: Andreas Martin Viktor Ropel, Gothenburg (SE); Ben Peter Lloyd, Gothenburg (SE); Matthias Yannick Philippe Le Saux, Gothenburg (SE); Konstantinos Chatziioannou, Öjersjö (SE); Klas Persson Signell, Kungalv (SE)

(73) Assignee: Volvo Car Corporation, Gothenburg (SE)

( * ) Notice: Subject to any disclaimer, the term of this patent is extended or adjusted under 35 U.S.C. 154(b) by 335 days.

This patent is subject to a terminal disclaimer.

(21) Appl. No.: 18/050,492

(22) Filed: Oct. 28, 2022

(65) Prior Publication Data

US 2024/0140240 A1     May 2, 2024

(51) Int. Cl.
*B60L 53/62*        (2019.01)
*B60L 50/64*        (2019.01)
(Continued)

(52) U.S. Cl.
CPC .......... *B60L 53/62* (2019.02); *H01M 10/441* (2013.01); *H01M 10/448* (2013.01); *B60L 50/64* (2019.02);
(Continued)

(58) Field of Classification Search
CPC .......... B60L 53/62; B60L 50/64; B60L 53/57; B60L 53/38; B60L 2240/667;
(Continued)

(56) References Cited

U.S. PATENT DOCUMENTS

| 6,285,162 B1 | 9/2001 | Koo |
| 8,134,338 B2 | 3/2012 | Choi |

(Continued)

FOREIGN PATENT DOCUMENTS

| CN | 107329088 B | 5/2021 |
| WO | 2015106336 A1 | 7/2015 |
| WO | 2020219440 A1 | 10/2020 |

OTHER PUBLICATIONS

Xia, et al., "State-of-charge Balancing of Lithium-ion Batteries with State-of-health Awareness Capability," IEEE Transactions on Industry Applications (vol. 57, Issue: 1, Jan.-Feb. 2021), pp. 673-684, DOI: 10.1109/TIA.2020.3029755, Date of Publication: Oct. 8, 2020.

(Continued)

*Primary Examiner* — Hunter B Lonsberry
*Assistant Examiner* — Henry R Hinton
(74) *Attorney, Agent, or Firm* — Amin, Turocy & Watson, LLP

(57) ABSTRACT

One or more embodiments described herein can facilitate electric charge transfer to/from one or more battery cells and/or multi-cell battery packs of an electric vehicle from a second electric vehicle, based at least in part on state of charge and/or state of health monitoring at one or more of the cell-level or pack-level. An exemplary method can comprise identifying, by a system operatively coupled to a processor, based on a comparison of a metric to a historical metric for vehicle performance, a current event that is defined by the metric as leading to degradation of a plurality of battery cells of a vehicle system, upon identifying the current event, determining, by the system, a subset of the plurality of battery cells that is beyond a threshold for remediation, and continuing to use, by the system, the subset (Continued)

such that the subset degrades towards end of life of the subset.

20 Claims, 13 Drawing Sheets

(51) Int. Cl.
*B60L 53/57* (2019.01)
*H01M 10/42* (2006.01)
*H01M 10/44* (2006.01)

(52) U.S. Cl.
CPC ...... *B60L 53/57* (2019.02); *H01M 2010/4271* (2013.01); *H01M 2010/4278* (2013.01); *H01M 2220/20* (2013.01)

(58) Field of Classification Search
CPC .... B60L 2250/20; B60L 2260/32; B60L 3/12; B60L 53/12; B60L 58/16; H01M 10/441; H01M 10/448; H01M 2010/4271; H01M 2010/4278; H01M 2220/20; H02J 7/005; H02J 7/007; H02J 7/00712; H02J 7/007188
See application file for complete search history.

(56) References Cited

U.S. PATENT DOCUMENTS

| 9,956,887 | B2 | 5/2018 | Duan et al. |
| 10,663,522 | B2* | 5/2020 | You .................. B60L 58/15 |
| 11,735,944 | B1* | 8/2023 | Schreiber ............. H02J 7/0048 |
| | | | 320/136 |
| 2014/0145678 | A1* | 5/2014 | Hwang .................... H02J 3/32 |
| | | | 320/118 |
| 2016/0327614 | A1 | 11/2016 | Young et al. |
| 2019/0176639 | A1* | 6/2019 | Kumar ................. B60L 3/0046 |
| 2020/0274368 | A1 | 8/2020 | Crouse, Jr. |
| 2021/0126471 | A1 | 4/2021 | Srivastava et al. |
| 2021/0135467 | A1* | 5/2021 | Werner ................ H02J 7/0013 |
| 2022/0153166 | A1* | 5/2022 | Rangel ................ G01R 31/382 |
| 2022/0382662 | A1* | 12/2022 | Hung ................... G06F 11/3476 |
| 2024/0192278 | A1* | 6/2024 | Jo ....................... H04L 63/0272 |

OTHER PUBLICATIONS

Chowdhury, et al., "An Integrated State of Health (SOH) Balancing Method for Lithium-Ion Battery Cells," 2019 IEEE Energy Conversion Congress and Exposition (ECCE), Date of Conference: Sep. 29, 2019-Oct. 3, 2019, DOI: 10.1109/ECCE.2019.8912932.

* cited by examiner

MESSAGING FOR TARGETED BATTERY UNIT DEGREDATION

BACKGROUND

To power electric vehicles, including fully electric vehicles and/or hybrid electric vehicles, one or more battery cells can be employed to store and provide electrical power. Existing systems, device and/or methods for transferring electrical charge to the one or more battery cells are generally limited to stationary and/or fixed locations, providing only limited utility to a user entity of such electric vehicles. When battery cells of an electric vehicle are running low, the user entity typically redirects or plans travel to a destination providing such fixed charging option.

SUMMARY

The following presents a summary to provide a basic understanding of one or more embodiments described herein. This summary is not intended to identify key or critical elements or to delineate any scope of the particular embodiments and/or any scope of the claims. The sole purpose of the summary is to present concepts in a simplified form as a prelude to the more detailed description that is presented later.

In one or more embodiments described herein, devices, systems, methods and/or apparatuses are described that can facilitate charging and/or discharging of a battery cell of an electric vehicle in the process of electrical charge transfer between electric vehicles, while directing the electrical charge transfer based on a state of health (SOH) of at least one battery cell of the charging or discharging electric vehicle.

According to one embodiment, a system can comprise a memory that stores computer executable components, and a processor that executes the computer executable components stored in the memory, wherein the computer executable components are executable to perform operations. The operations comprise identifying, based on a comparison of a metric to a historical metric for vehicle performance, a current event that is defined by the metric as leading to degradation of a plurality of battery cells of a vehicle system, upon identifying the current event, determining a subset of the plurality of battery cells that is beyond a threshold for remediation, and continuing to use the subset such that the subset degrades towards end of life of the subset.

According to another embodiment, a method can comprise identifying, by a system operatively coupled to a processor, based on a comparison of a metric to a historical metric for vehicle performance, a current event that is defined by the metric as leading to degradation of a plurality of battery cells of a vehicle system, upon identifying the current event, determining, by the system, a subset of the plurality of battery cells that is beyond a threshold for remediation, and continuing to use, by the system, the subset such that the subset degrades towards end of life of the subset.

According to yet another embodiment, a non-transitory machine-readable medium can comprise executable instructions that, when executed by a processor, facilitate performance of operations. The operations comprise identifying, by the processor, based on a comparison of a metric to a historical metric for vehicle performance, a current event that is defined by the metric as leading to degradation of a plurality of battery cells of a vehicle system, upon identifying the current event, determining, by the processor, a subset of the plurality of battery cells that is beyond a threshold for remediation, and continuing to use, by the processor, the subset such that the subset degrades towards end of life of the subset.

An advantage of the aforementioned system, method and/or non-transitory, machine-readable medium discussed above can be an ability to identify one or more battery cells for targeted degradation, such as to limit degradation, remediation costs and/or replacement costs to only a subset of battery cells of an electric vehicle.

Another advantage of the aforementioned system, method and/or non-transitory, machine-readable medium discussed above can be an ability to identify one or more battery cells for targeted degradation, such as to allow degradation. For example, an electric vehicle can be in a position to be used, and thus powered, regardless of whether a battery cell is degraded, and thus it can be desired to allow degradation of a select few battery cells. That is, it can be desired to allow greater degradation of a select one or more battery cells, as compared to allowing lesser depredation of a greater number of battery cells. Further, this can allow for targeted remediation costs and/or replacement costs to only a subset of battery cells of an electric vehicle. This can also allow for optimization of battery cell use of the subset, such as using battery cells having greater state of health or state of charge to optimize performance of one or more vehicle systems.

Still another advantage of the aforementioned system, method and/or non-transitory, machine-readable medium discussed above can be an ability to optimize use of battery cells for optimum performance. For example, differently, a targeted battery cell can be one with a high state of health, such as where a high performing battery cell is desired to be used for the charge, to thus get an electric vehicle the "last mile" to its destination.

Yet another advantage of the aforementioned system, method and/or non-transitory, machine-readable medium discussed above can be an ability to selectively control use of different battery cells relative to different speeds of charge. That is, different speeds of charge can have different effects on battery cells in general. A higher speed quick charge can reduce a life of a battery cell to a greater extent than a lower speed trickle charge.

In one or more embodiments of the aforementioned system, method and/or non-transitory, machine-readable medium, an analytical model, such as an artificial intelligence model, can perform one or more operations. These operations can comprise comparison of battery cell states of health and/or states of charge, automatic selection of a battery cell for use in an electric charge transfer based on preset thresholds, and/or use of historical data to predict a result of an electric charge transfer on a battery cell. An advantage of this can be an ability to quickly and accurately facilitate an electric charge transfer, such as in response to a low charge warning and/or notification of available electric charge transfer.

As used herein, state of health (SOH) can comprise state of swelling, temperature, current/voltage input/output and/or material composition, where state of charge (SOC) can comprise current charge level and/or historical charge level information.

DESCRIPTION OF THE DRAWINGS

One or more exemplary embodiments are described below in the Detailed Description section with reference to the following drawings.

DETAILED DESCRIPTION

Figure 1:
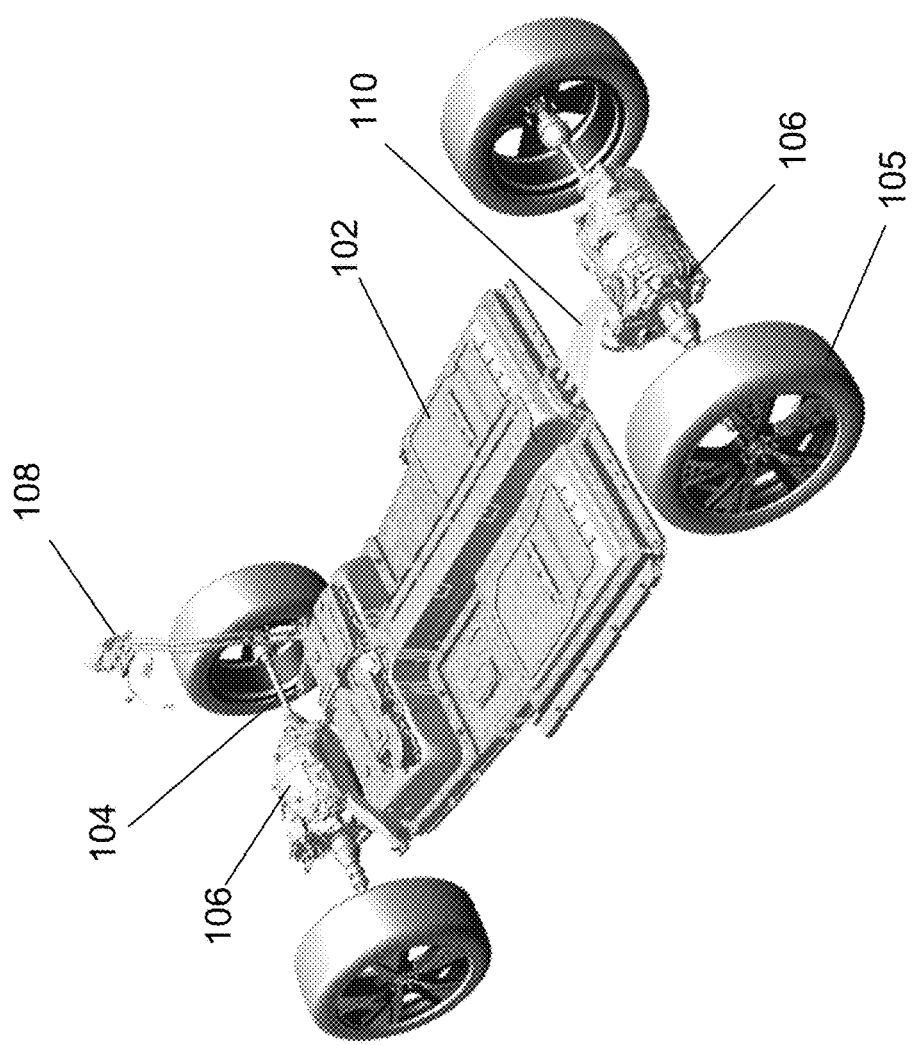
FIG. 1 illustrates a schematic diagram of a portion of an electric vehicle that can employ an electric charge transfer system to transfer electric charge between electric vehicles, in accordance with one or more embodiments described herein.

This disclosure relates generally to electric vehicles and, more particularly, to mobile charging for electric vehicles. More specifically, this disclosure relates to facilitating charging and/or discharging of a battery cell of an electric vehicle in the process of an electric charge transfer between electric vehicles, while directing the electric charge transfer based on a state of health (SOH) and/or state of charge (SOC) of at least one battery cell of the charging or discharging electric vehicle.

Differently, in existing frameworks for electric vehicles, electric charge transfer can be facilitated using a fixed location charging station. Such charging station can be located at a private residence or at a public charging location. The transfer of the electric charge to the electric vehicle can be controlled by a controller at the electric vehicle itself and/or by a controller at or associated with the charging station.

In existing situations, trips using the electric vehicle are generally planned based on available electric charge of the electric vehicle and upon charging stations that can be employed during the trip to recharge the electric vehicle. Because of the finite nature of fixed charging locations, it can be difficult to plan for unforeseen occurrences, unplanned and/or unintended low battery cell charge, and/or even unforeseen detours during the trip.

That is, a user entity can receive a notification of low charge, a user entity can have ignored a previous indication of low charge (whether accidental or otherwise), and/or a battery cell can malfunction. In any of these cases, to limit and/or prevent damage to a battery cell of the electric vehicle and/or to limit and/or prevent stranding of the electric vehicle without charge, it can be desirable to make an electric charge transfer to the electric vehicle. Indeed, when an electric vehicle runs very low on battery power, a user entity has few choices left available to them with existing electric charge frameworks. The user entity can request a tow to a charging station and/or otherwise limp on to a charging station, if it is possible for the electric vehicle to successfully make such trip with any remaining battery power.

Further, when it is finally possible to execute an electric charge transfer to the low charge electric vehicle, conventional electric charging does not account for any differences and/or issues relative to one battery cell as compared to another battery cell of the electric vehicle. For example, in existing technologies, one or more battery cells can be employed to power an electric driveline and/or auxiliary systems. These battery cells can operate with a direct current (DC) voltage or can provide fluctuating voltage (e.g., AC voltage). To control the battery cells, existing battery management systems (BMSs) generally can include a set of sensor cables and/or submodules that can add complexity and/or cost to a parent system employing the BMS and one or more of the battery cells. The BMSs can monitor battery cell parameters. However, it is often the case that information obtained by the BMS is not employed during charging or discharging, but rather is used only to monitor and to provide notifications/information regarding the battery cells monitored.

That is, a blanket charge of battery cells of an electric vehicle often cannot account for difference in states of health of different battery cells of the electric vehicle. It can be desirable to charge different battery cells differently, such as based on speed of charge and/or amount of charge order of charge. However, these aspects are not accounted for in existing charging frameworks. This deficiency can be an issue where a low charge of the electric vehicle was caused by an unintended low charge, such as due to a battery cell malfunction and/or low state of health. As used herein, reference to a state of health and/or malfunction of a battery cell can likewise be equally applicable to a battery pack comprising two or more battery cells.

To make up for one or more deficiencies of the above-described existing frameworks and/or technologies, a system and method are described herein that can facilitate charging and/or discharging of a battery cell of an electric vehicle, in the process of electric charge transfer between electric vehicles. The electric charge transfer can be controlled based on battery cell parameters and/or global battery pack parameters, where a battery pack can comprise two or more battery cells. In this way, low battery cell and/or battery pack life and/or malfunction can be known, and the electric charge transfer can be executed based on this state of health information.

As indicated above, reference to a state of health and/or malfunction of a battery cell can likewise be equally applicable to a battery pack comprising two or more battery cells. As used herein, a battery pack state is understood as being a function of battery cell states of a battery pack, also herein referred to as a battery cluster. Thus, monitoring and/or order/priority determination at a pack level still can comprise monitoring and/or order/priority determination at a battery cell level. That is, pack level monitoring and/or determinations can comprise, be based on and/or be a function of battery cell state monitoring and/or determination. As such, any description above and/or below with respect to a battery cell also can be applied to a battery pack, such as in connection with aggregation of levels, readings and/or data for the battery cells comprised by the battery pack.

For example, one or more frameworks discussed herein can allow for and/or control charging of a first battery of a first vehicle by a second battery of a second vehicle. Each of the first vehicle and second vehicle can be an electric vehicle. It is noted that the one or frameworks described herein can be utilized with any electric vehicle and are not limited only to commercial and/or consumer electric vehicles. The one or more frameworks described herein can be applicable to any of a military vehicle, marine vehicle such as a boat or marine drone, winged vehicle such as a plane, and/or rotor-ed vehicle such as a helicopter or drone. Likewise, usage can extend to a robot and/or any suitable movable device that uses a battery cell.

The electric charge transfer between the vehicles can be made by any of a physical coupling and/or wireless coupling, such as using inductive charging. The electric charge transfer can be facilitated between stationary or moving vehicles. Scheduling and/or initiation of the charge transfer itself can be facilitated by a system at either electric vehicle and/or by a third-party system. Operations to schedule and/or initiate the charge that can be facilitated by one or more frameworks described herein can comprise, but are not limited to, broadcasting a request for electric charge, obtaining an offer for electric charge, notifying acceptance of an offer for electric charge and/or compensating for the electric charge, routing to meet to facilitate the electric charge.

Additional and/or alternative operations that can be performed by one or more frameworks described herein to schedule and/or initiate the charging process can comprise, but are not limited to, identifying electric vehicles in a vicinity of the charge accepting vehicle, identifying an electric vehicle that is available to transfer an electric charge, setting an electric charge sharing option to indicate availability, sending notifications between the participating vehicles, determining and/or aligning charging parameters, and/or handling any financial transaction associated with the electric charge transfer.

Further operations that can be performed by one or more frameworks described herein can comprise obtaining confirmation of capability of completing the electric charge, determining an amount of the electric charge, determining a speed of the electric charge, determining a battery cell to discharge at the discharging vehicle (e.g., transferring vehicle), determining a battery cell to charge at the charge accepting vehicle (e.g., receiving vehicle), determining a state of health of one or more battery cells of an electric vehicle participating in the electric charge transfer, aligning the electric vehicles participating in the electric charge transfer, and/or maintaining the alignment during the electric charge transfer.

Relative to monitoring and/or maintaining a state of health of one or more battery cells of an electric vehicle participating in an electric charge transfer, the one or more frameworks described herein can perform various processes. These processes can be directed to targeted charge and/or discharge of one or more battery cells. For example, it can be desired to charge/discharge a battery cell that has a low state of health, such as for targeted degradation of only that battery cell, as compared to other cells of the electric vehicle. One or more battery cells can be identified for targeted degrading activities, such as a quick electric charge transfer (e.g., different from a trickle charge). In this way, a limited number of battery cells can be degraded over time and then can be replaced. In another example, it can be desired to spread out charge/discharge over time among battery cells, such as to provide for a generally equivalent states of health of such battery cells.

In one or more cases, state of charge and/or state of health information can be employed for a different targeted charging purpose. Such other targeted charging purpose can include optimization for balancing charge (e.g., achieving a common charge level) across one or more, such as all, units (battery cells/battery packs), optimization for achieving higher performance by first using units having higher charge, optimization for different states of charge for use by different vehicle systems, and/or optimization for bypassing one or more battery cells such as based on a present low state of charge and/or state of health.

In accordance with this targeted use of battery cells, one or more operations that can be performed by one or more frameworks described herein can comprise, without being limited thereto, monitoring of battery cell states of charge, monitoring of battery cell states of health, identification of a battery cell for allowed degradation, determination of effect of an electric charge transfer to a battery cell, determining if a battery cell is capable of the electric charge transfer, and/or identifying a threshold for remediation of a battery cell as corresponding to a state of health of the battery cell.

Turning now to the illustrated figures, the following detailed description is merely illustrative and is not intended to limit embodiments and/or application/use of embodiments. Furthermore, there is no intention to be bound by any expressed or implied information presented in the preceding Background or Summary sections or in this Detailed Description section.

One or more embodiments will now be described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling.

Likewise, it will be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, the terms "entity", "requesting entity" and "user entity" can refer to a machine, device, component, hardware, software, smart device and/or human.

While one or more devices and/or systems are described below with reference to a wheeled vehicle, such as an automobile, the one or more embodiments described herein are not limited to this use. A framework described herein can be implemented in/at/for any suitable electric vehicle (EV). Indeed, the one or more systems, methods and/or non-transitory computer-readable mediums described herein can be utilized with any of a military vehicle, marine vehicle such as a boat or marine drone, winged vehicle such as a plane, and/or rotor-ed vehicle such as a helicopter or drone. Likewise, usage can extend to a robot and/or any suitable movable device using a battery cell.

Figure 2:
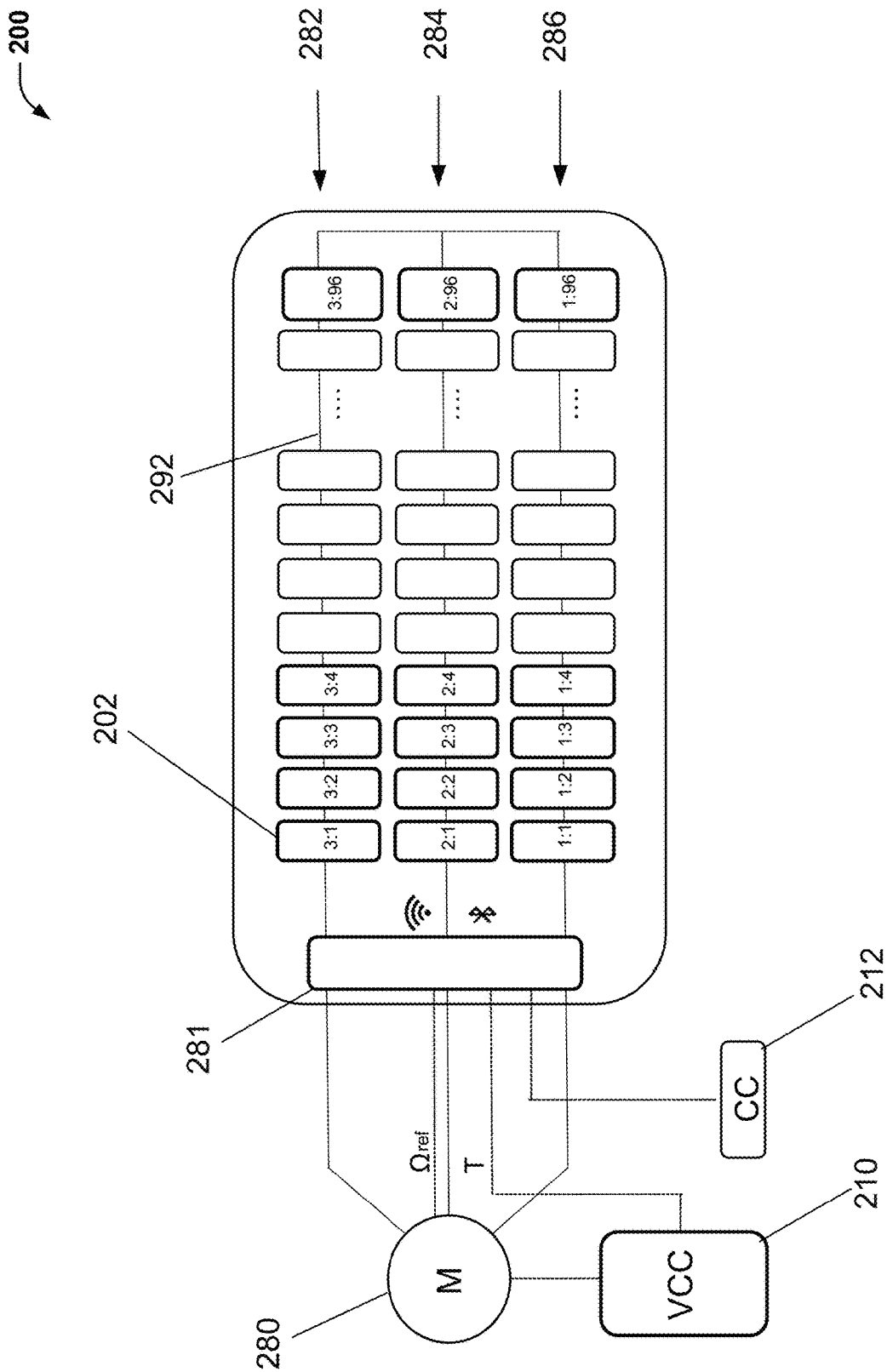
FIG. 2 illustrates a block diagram of an exemplary battery system to/from which an electric charge can be transferred from another electric vehicle, using an electric charge transfer system, in accordance with one or more embodiments described herein.
Figure 3:
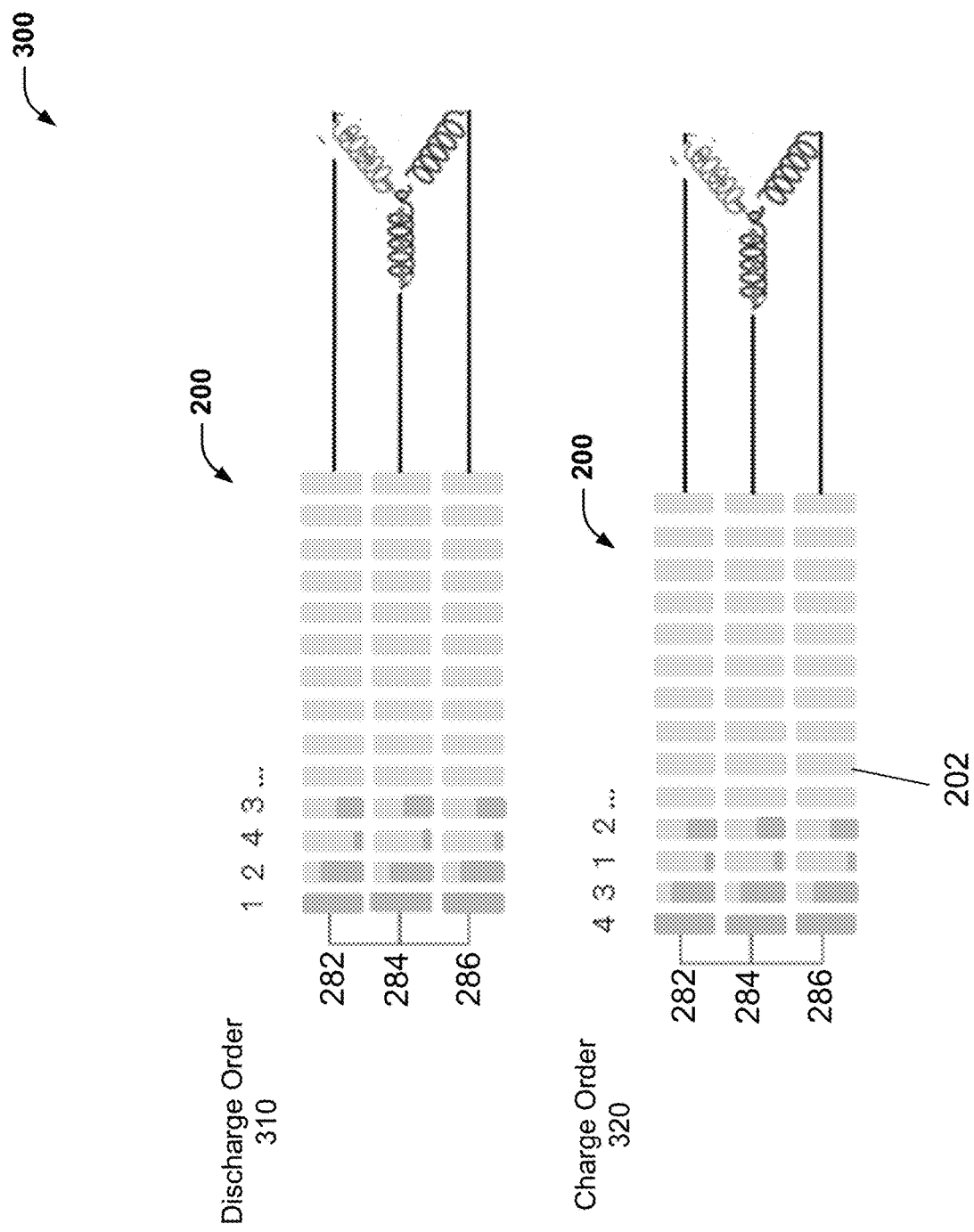
FIG. 3 illustrates another block diagram of the exemplary battery system of FIG. 2, in accordance with one or more embodiments described herein.

Looking first to FIGS. 1-3, an electric vehicle is illustrated at varying levels of granularity.

Turning first to FIG. 1, a portion of an electric vehicle 100 is illustrated. The electric vehicle 100 comprises a body portion 102, a pair of axles 104, and wheels 105 connected to the axles 104 for driving movement of the body portion 102. Rotation of the axles 104 can be driven by a pair of motors 106, such as traction motors. The motors 106 can be directly controlled by a global controller 108 that can be operably connected to the motors 106 by one or more connectors 110, such as wires and/or cables. While not shown specifically at FIG. 1, the global controller 108 can control a battery system, such as the battery system 200 (FIG. 2 or FIG. 3), such as by controlling local controllers (e.g., battery cell level and/or batter pack level controllers) of such battery system. As such, the battery system, via the connectors 110 and/or other connectors, such as wires and/or cables, can provide power, such as in a form of AC and/or DC voltage for driving the motors 106, among other uses.

Referring next to FIG. 2, a depiction of an exemplary battery system is provided at 200. This battery system 200 can be a multi-pack battery system or a multi-string battery system. Generally, the battery system 200 can provide varying levels of AC output voltage for driving different motors. Likewise, such battery system can, in one or more embodiments, contemporaneously provide different AC voltage to different motors, which different AC voltages can have different phases. Such battery system can provide power directly to the motors and to one or more auxiliary systems of a vehicle at least partially contemporaneously. As mentioned above, balancing of cell/pack charge and/or health can enable this provision of different current/voltage outputs to plural apparatuses external to the battery system.

The battery system 200 can comprise and/or operably function in connection with a vehicle central controller (VCC) 210 and a charge controller (CC) 212. The VCC 210 can facilitate routing of different voltages to different vehicle apparatuses. The CC 212 can aid in controlling electric charge transfer to the battery system 200, to increase depleted charge.

The battery system 200 also can comprise three strings 282, 284 and 286 of units 202. Each unit 202 can be a battery cell or a multi-cell battery pack. Each unit 202 can have a different number and can be identified, such as by a respective controller and/or processor by the string number and unit number, such as string:unit or 3:96. Each of the units 202 within each separate string can be connected to one another, such as via a string bridge 292 connected to respective AC poles of the respective controllers of the units 202. Each string 282, 284 and 286 can be operably connected, such as communicatively connected wirelessly, to a global controller 280. A transmitter 281 can be coupled to each of the strings 282, 284, and 286, and also to the global controller 280, such as for communicating state of health and/or state of charge information of the battery system 200.

The battery system 200 can vary output polarity from one or more cells, such as a multi-cell string, to selectively provide one or both of alternating current (AC) voltage output or direct current (DC) voltage output from the battery system 200 due to the varying of the output polarity. To provide the AC voltage output and/or DC voltage output, the local controllers, e.g., of the individual units 202, can selectively separately provide negative output voltage, positive output voltage, or no output voltage. That is, relative to one unit 202, a respective unit controller can provide one of negative output voltage, positive output voltage or no output voltage at a time. Regarding provision of no voltage, a unit controller can be configured, such as via one or more elements thereof, to bypass one or more of the battery cells controlled by the respective unit controller. Further, one or more units 202 can thus be bypassed while other units 202 of a same string can provide an output voltage or be provided a charging current. In one or more embodiments, two or more, or even all, units 202 of a string can be bypassed to provide less or even no voltage from a respective battery system 200. In one or more embodiments, an entire string 282, 284 or 286 can be bypassed.

In one or more embodiments, the global controller 280 can control and/or manage the local unit controllers. The strings 282, 284 and 286 can be controlled by the global controller 280 to provide a three phase current source via a parallel coupling of the battery cell strings. Accordingly, an output, represented as a three phase sinusoidal output, can be provided, such as to generate a rotating magnetic field for operation of a motor, such as a motor driving one or more axles, gears and/or wheels of a vehicle, such as the electric vehicle 100. Indeed, in one or more embodiments, one or more motors can be controlled directly by such battery system 200.

In one or more embodiments, such direct control can be implemented absent employment of additional inverters, transformers, chargers and/or other components typically implements in existing technologies comprising constant voltage DC batteries. Likewise, in one or more embodiments, the battery system 200 can be operated to charge or discharge one or more battery cells at a time, and such as without additional transformers, inverters or chargers. In one or more embodiments, selective charging of one or more battery cells can be performed simultaneously with selective discharging of one or more other battery cells of the same or different multi-cell battery pack and/or multi-cell string.

In one or more embodiments, an AC output and a DC output can be provided contemporaneously by the battery system 200. In one or more embodiments, the battery system 200 can be controlled to convert voltage from one or more respective battery cells to a lesser voltage, such as to power one or more auxiliary systems of a vehicle (e.g., electric vehicle 100), such as panels, lights and/or AC chargers.

In one or more embodiments, units 202 can be employed (e.g., charged and/or discharged) based on a charge level and/or a health level of the respective units 202, such as employing battery cells 202 having a highest combined charge first for charging a battery system of another electric vehicle.

In one or more embodiments, a battery cell-level order can be employed, such as by the local controllers, the CC 212 and/or the global controller 280 for electric charge transfer to/from the battery system 200. For example, as depicted at schematic 300 of FIG. 3, a priority order can be determined, such as by a respective determination component of the global controller 280, such as on a string-level basis. In one or more embodiments, as shown, each string 282, 284, 286 can be operated according to a same charge and/or discharge priority. As shown, discharge order at representation 310 and/or charge order at representation 320 can be based on a different order than the physical series-connected order of a respective string. For example, at representation 310, although battery cells a, b, c and d (202) can be connected in series in that order, discharge order can be a, b, d, c, etc. for the battery cells 202. In one or more other embodiments, any one or more strings can be operated using a different unit order than other strings of the battery system 200.

In an embodiment, the units 202 at the strings at FIG. 3 can represent multi-cell battery packs. In another embodiment, the units 202 at the strings at FIG. 3 can represent individual battery cells. That is, the priority order for either of discharging and/or charging can be provided at a battery cell-level or at a battery pack-level. Furthermore, in one or more embodiments, both battery cell-level and battery pack-level priority (e.g., order) can be determined, such as by a respective determination component of the global controller 280 and employed.

Different priorities can be employed, such as depending on state of health (SOH) or state of charge (SOC) of the respective battery cells of the battery system 200. As noted above, as used herein, SOH can comprise state of swelling, temperature, current/voltage input/output and/or material composition, where SOC can comprise current charge level and/or historical charge level information.

Figure 4:
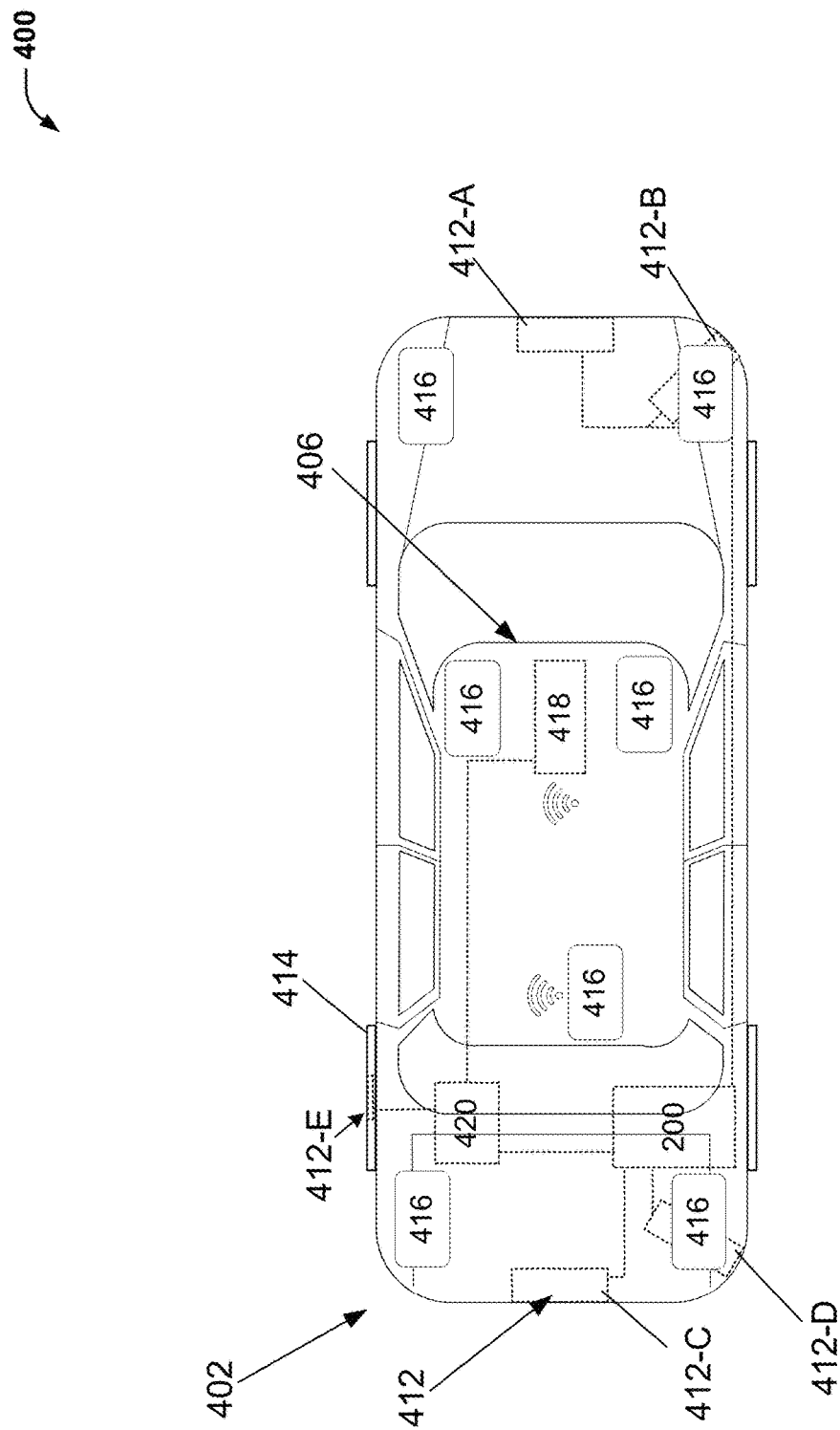
FIG. 4 illustrates an electric vehicle comprising an electric charge transfer system, in accordance with one or more embodiments described herein.
Figure 5:
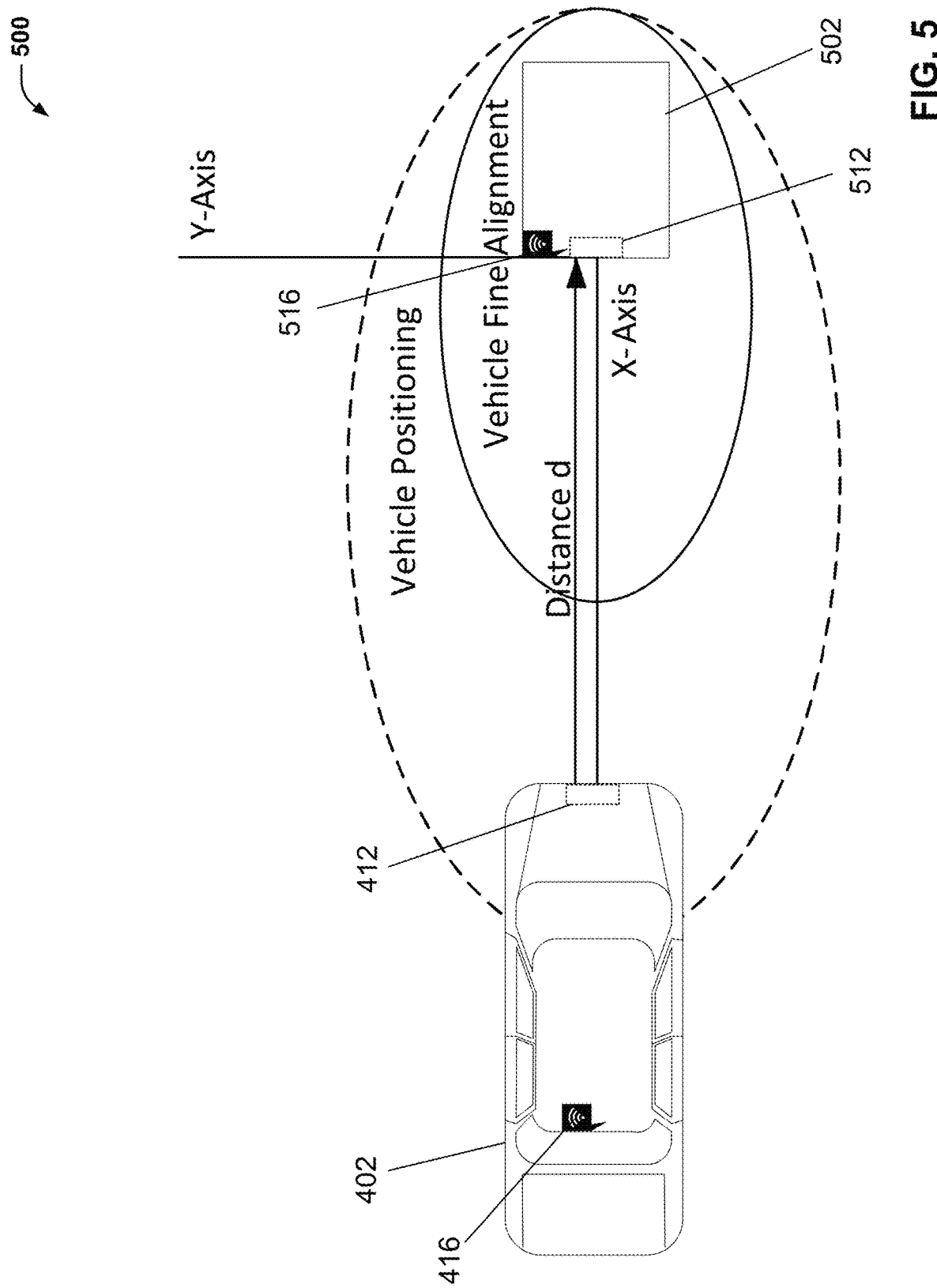
FIG. 5 illustrates positioning and alignment of the electric vehicle of FIG. 4, using the electric charge transfer system of FIG. 4, in accordance with one or more embodiments described herein.
Figure 6:
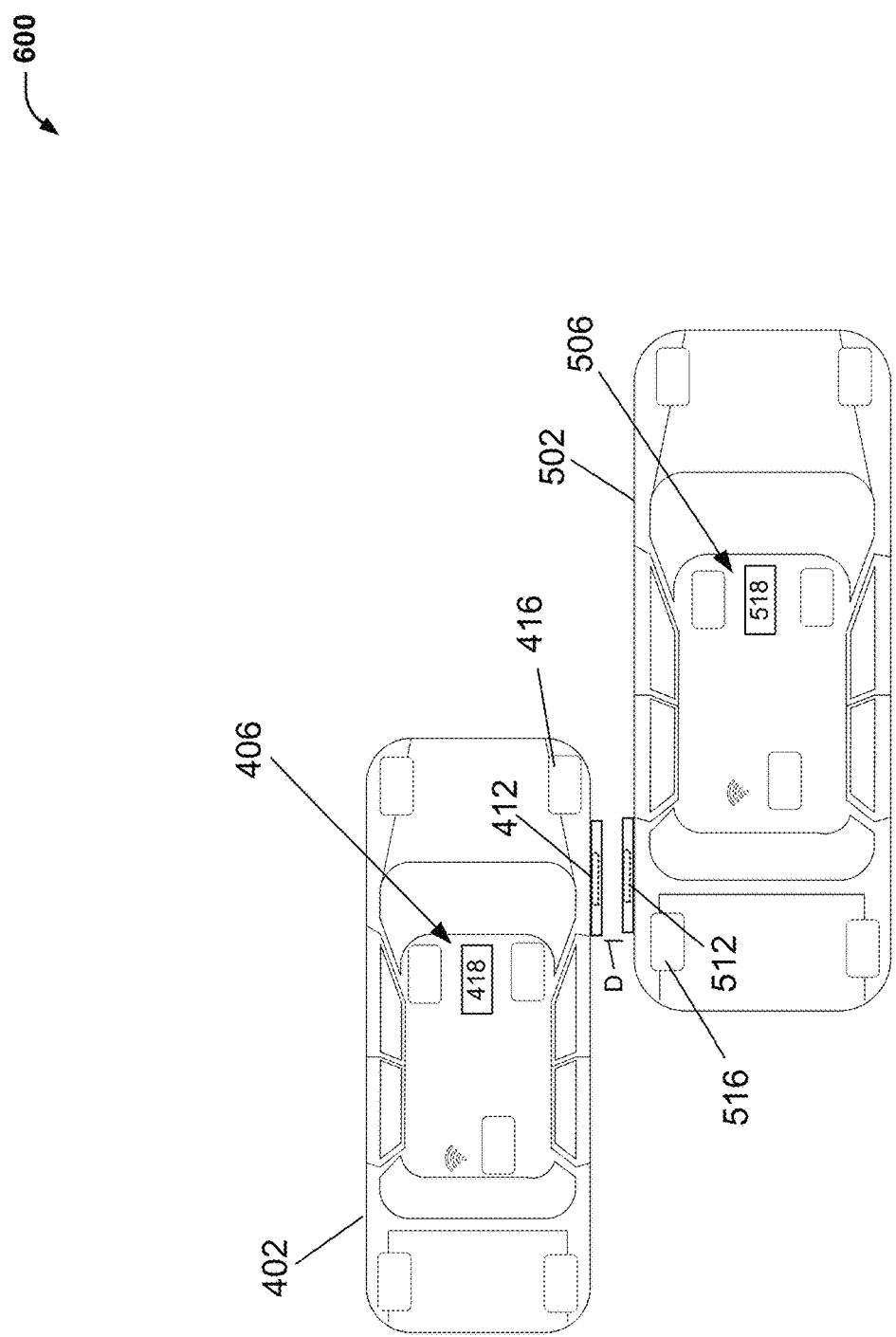
FIG. 6 schematically depicts an electric charge transfer between a pair of electric vehicles, using the electric charge transfer system of FIG. 4, in accordance with one or more embodiments described herein.

Looking next to FIGS. 4-6, an electric vehicle charging system is generally illustrated that can facilitate charge transfer to/from a battery system, such as the battery system 200. Repetitive description of like elements employed in one or more other embodiments described herein is omitted for sake of brevity. Although FIGS. 4-6 reference a vehicle 402, the description also can be applicable to the vehicle 100 (FIG. 1).

At FIG. 4, a schematic is illustrated comprising an electric vehicle 402, a battery system 200, a targeted electric charge transfer system 420 and a guidance control system 406.

The electric vehicle 402 is illustrated as a wheeled vehicle comprising a body 408 and a set of wheels 414 coupled to the body for moving the body 408 in response to activation of a motor powered by the battery system 200. The battery system 200, in addition to powering one or more motors for moving the electric vehicle 402, also can power one or more auxiliary systems of the electric vehicle 402, such as an air conditioning/heating system, navigation system, dashboard system and/or even the targeted electric charge transfer system 420.

The targeted electric charge transfer system 420 can generally be configured to monitor the battery system 200 and to determine availability of a battery cell (whether separately or as part of a battery pack) for use in an energy transfer between at least a pair of electric vehicles.

The targeted electric charge transfer system 420 can comprise and/or be operatively coupled to one or more electric charge coupling devices 412. The coupling devices 412 can be operably coupled also to the battery system 200 to facilitate electric charge transfer between the vehicle 402, comprising the coupling devices 412, and another electric vehicle.

As illustrated, the coupling devices 412 can be disposed at any suitable location of the electric vehicle 402, or at any suitable location of the body 408. For example, a coupling device 412-A can be located at a forward location of the vehicle 402, such as along a front bumper of the body 408. A coupling device 412-B can be located adjacent, along and/or at a front headlight area of the body 408. A coupling device 412-C can be located at a rear location of the vehicle 402, such as along a rear bumper of the body 408. A coupling device 412-D can be located adjacent, along and/or at a rear headlight area of the body 408. A coupling device 412-E can be located adjacent, along and/or at a wheel 414, such as being located adjacent, along and/or at a hubcap area of a wheel 414.

Any of the coupling devices can comprise a physical coupling, such as a plug, port, wire and/or cable. Additionally and/or alternatively, any of the coupling devices can comprise a wireless coupler, such as an inductive coupler that can allow for electric charge transfer to/from another inductive coupler, such as of another electric vehicle, when within a defined proximity of the other inductive coupler. A wireless coupler can comprise a laser generator such as for use in alignment of couplers and/or for transferring charge.

The guidance control system 406 can be operably coupled to the targeted electric charge transfer system 420 for generally positioning and then more directly aligning the electric vehicle 402 relative to another electric vehicle 402 for facilitating an electric charge transfer. The guidance control system 406 can comprise a sensor controller 418 and a plurality of signal components 416, such as antennas. The signal components 416 can comprise any suitable device and/or component for facilitating signaling between the electric vehicle 402 and a location to receive/send an electric charge, such as another electric vehicle.

One or more, such as each, of the signal components 416 can be an ultrawideband (UWB) antenna or Bluetooth low energy antenna suitable for transmitting and/or receiving a signal, such as a Bluetooth low energy signal. Distance between the various signal components 416 and the various coupling devices 412 at the electric vehicle 402 can be fixed, such as known and/or retrievable by the respective guidance control system 406. That is, the various signal components 416 can be located for common movement with the coupling device 412, relative to a target position, such as a target coupling device of another electric vehicle.

One or more signal components 416 of the guidance control system 406 can be paired with a signal component of the target position, such as a UWB antenna of the target position. The pairing can be by way of a Bluetooth low energy connection, WiFi and/or other suitable connection.

Two or more signal components 416 at the vehicle 402 can be employed to provide triangulation of one of the coupling devices 412 relative to a respective coupling device of the target position. In one or more embodiments, the one or more signal components 416 can transmit position data, such as raw data and/or calculated data to a respective guidance control system at the target position (e.g., another electric vehicle). In one or more embodiments, the guidance control system 406 and/or one or more signal components 416 can be configured to transmit a wake signal to the target position, such as upon being within a selectively determined distance range and/or meeting a selectively determined distance threshold from the target position. The threshold and/or range can be selected by a user entity, such as using a suitable display interface component of the guidance control system 406.

As illustrated at schematic 500 of FIG. 5, the guidance control system 406 can employ a respective controller component and/or calculation component to employ data received from the signal component 416 to determine a current distance between a selected on of the coupling devices 412 and a respective coupling device 512 of the target position 502. The guidance control system 406, such as employing any of any suitable component, AI, learning model, algorithms, lookup tables and/or databases, can determine a distance between the selected coupling device and the target coupling device 512 based on a time measurement of a signal from the signal component 416.

In one or more embodiments, the time measurement can comprise a time of flight measurement. As used herein, time of flight (ToF) is the measurement of the time taken by an object, particle or wave (be it acoustic, electromagnetic, etc.) to travel a distance through a medium. This information can then be used to measure velocity or path length, or as a way to learn about the particle or medium's properties (such as composition or flow rate). The traveling object may be detected directly (e.g., via an ion detector in mass spectrometry) or indirectly (e.g., by light scattered from an object in laser doppler velocimetry).

In one or more embodiments, additionally and/or alternatively, the time measurement can comprise a time of arrival measurement. As used herein, time of arrival (TOA or ToA) is the absolute time instant when a radio signal emanating from a transmitter reaches a remote receiver. The time span elapsed since the time of transmission (TOT or ToT) is the time of flight (TOF or ToF). Time difference of arrival (TDOA) is the difference between TOAs.

With reference to FIGS. 4 and 5 together, a signal component 416 can send a particle, wave, and/or signal such as acoustic, electromagnetic, light and/or other optical signal, and/or radio signal towards the target signal component 516, and/or vice versa. The particle, wave and/or signal transmitted can take a certain time to travel a distance through a defined medium between the signal components 416 and 516. By the particle, wave and/or signal received at the receiving signal component and/or reflected back at the transmitting signal component, time data can be determined (time of flight and/or time of arrival). Using this information, present distance between the signal component 416 and 516 can be determined, such as relative to two zones. The first zone can be a general vehicle positioning zone. The second zone can be a more precise vehicle fine alignment zone that is smaller than the first zone.

Turning next to FIG. 6, an exemplary use of the guidance control system 406 of the electric vehicle 402, in connection with a guidance control system 506 of another electric vehicle 502, is illustrated at schematic 600. It is appreciated that the guidance control system 406 and/or the respective sensor controller 418 can be comprised by a respective targeted electric charge transfer system 420 of the electric vehicle 402. Likewise, the guidance control system 506 and/or the respective sensor controller 518 can be comprised by a respective targeted electric charge transfer system of the electric vehicle 502. It is noted that either of the electric vehicle 402 or the electric vehicle 502 can be the charge receiving vehicle or the charge transferring vehicle. Generally, using the guidance control system 406 and 506, a minimum distance D can be determined and executed between the coupling devices 412 and 512, and then the transfer of electric charge can commence.

It is noted that the transfer of electric charge can be a slower trickle charge, a normal speed charge or a more rapid quick charge. Depending on the speed of the electrical charge transfer and upon additional information regarding battery cells at the receiving and transferring vehicles, target battery cells for facilitating the transfer of electric charge can be determined by a respective targeted electric charge transfer system of at least one of the participating electric vehicles.

Figure 7:
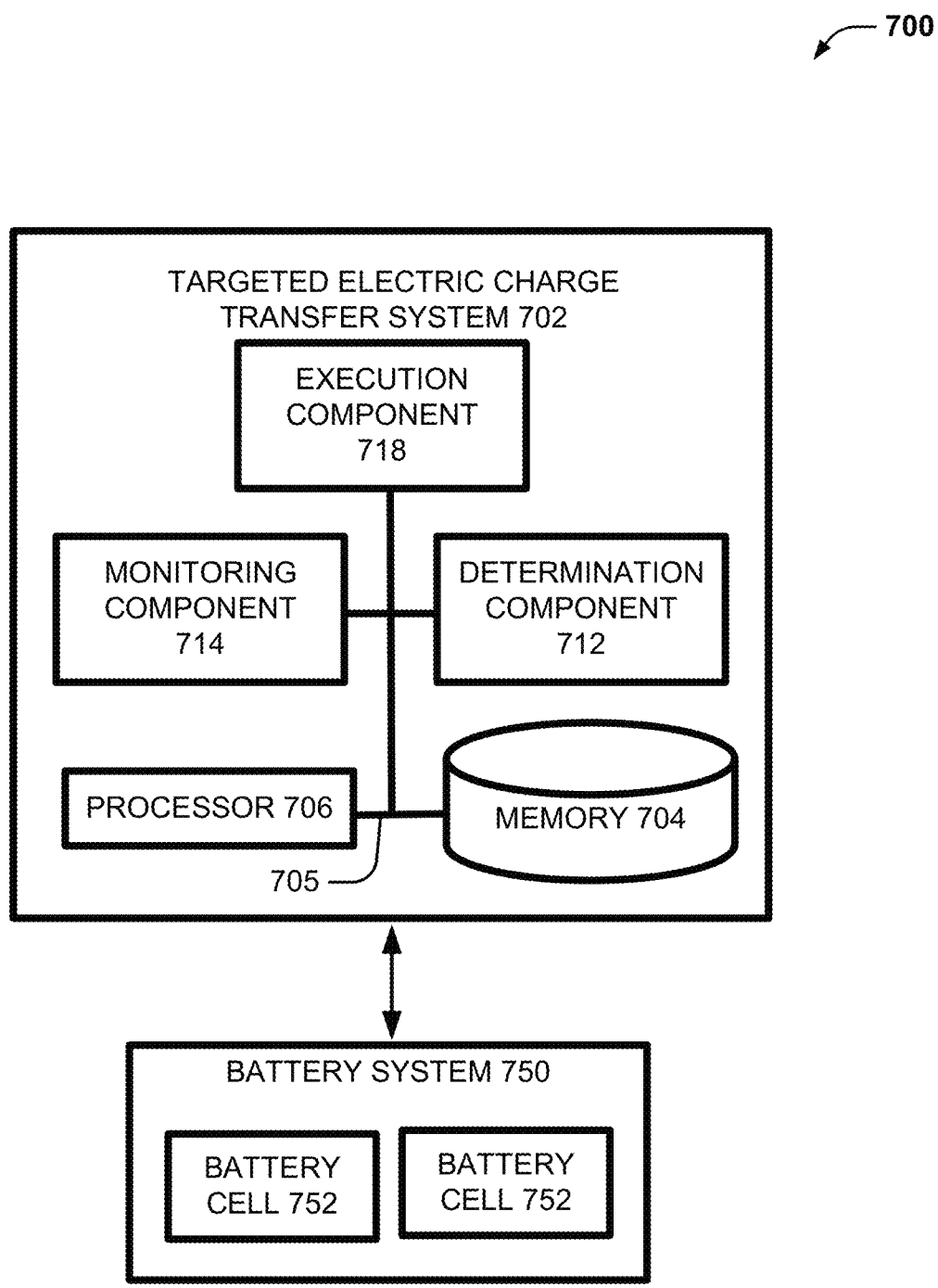
FIG. 7 illustrates an electric charge transfer system, in accordance with one or more embodiments described herein.

Turning now to FIG. 7, illustrated is a non-limiting architecture 700 comprising a targeted electric charge transfer system 702. The system is labeled as "targeted" in that the system is configured to determine a subset of battery cells of an electric vehicle to continue to use and/or not use based on cell states of a plurality of battery cells comprising the subset.

The targeted electric charge transfer system 702 can comprise one or more components, such as a memory 704, processor 706, bus 705, determination component 712, monitoring component 714 and/or execution component 718. Generally, the targeted electric charge transfer system 702, and thus non-limiting system 700, can facilitate selection of a battery cell, based on a threshold for remediation, to continue to use such that the battery cell (or battery cells) is degraded towards end of life of the battery cell. Generally, targeted electric charge transfer system 702 can be located at any suitable location of an electric vehicle having the battery system 750. The battery system 750 can comprise a plurality of battery cells 752.

The monitoring component 714 can monitor cell states of a plurality of battery cells (e.g., battery cells 752) of a power source of a vehicle system. In one or more embodiments, the power source can be a primary power source. The term "primary power source" of an electric vehicle (or vehicle system) can refer to a main power source of the electric vehicle (or vehicle system), such as that provides a majority of power to any one or more vehicle systems of the electric vehicle, such as for driving movement of the electric vehicle.

The determination component 712 can, based on data defining the battery cells 752, such as defining cell states of the plurality of battery cells, identify a subset of the plurality of battery cells. The subset can be identified as being beyond a threshold for remediation. As used herein, this can refer to the battery cell or battery cells of the subset being unable to be remediated (e.g., repaired, fix, refreshed to 100% health).

For example, over time a battery cell 752 can have degraded, such that full charge (as compared to a healthy or new battery cell) cannot be obtained and/or such that a state of health of 100% health (as compared to a healthy or new battery cell) cannot be obtained. That is, the battery cell 752 that is beyond a threshold for remediation can have a state of health that is less than 100%, can exhibit temperature fluctuations, and/or can be less than fully reliable relative to consistent power output.

The threshold for remediation itself can be based on any suitable quantity and/or quality, such as a defined state of health of a battery cell. As indicated above, a SOH can comprise state of swelling, temperature, current/voltage input/output and/or material composition, where SOC can comprise current charge level and/or historical charge level information. That is, a threshold for remediation can comprise, rate and/or quantify any one or more of these aspects. The threshold for remediation can be set and/or otherwise defined by a user entity, by default (e.g., defined by a battery cell manufacturer) and/or by any other administrator entity of the battery system 750 and/or targeted electric charge transfer system 702.

In response to the subset (e.g., one or more battery cells 752) being identified as being beyond the threshold for remediation, the execution component 718 can continue to use the subset. The use can, due to the state of health of the subset, comprise energy transfer at the subset such that the subset degrades towards end of life of the subset. That is, the subset itself is beyond a threshold for remediation, and thus further use can further damage the subset.

However, this damage is targeted, in view of the identification of the subset. That is, as compared to degradation of all battery cells of a battery system, a few battery cells, such as the subset, can instead be identified for use in a charge from another electric vehicle. In such case, only the subset can be replaced and quantity lost cost to an owner entity and/or user entity of the electric vehicle.

Put another way, such battery cell can be identified due to the degrading nature of some battery use, such as including EV to EV charging, such as where a more rapid quick charge can, due to the physics of the quick charge, cause damage to the receiving and/or transferring battery cell. Additionally and/or alternatively, because only a subset of battery cells can be charged more often by an EV to EV charge, the frequency itself can lead to increased degradation of the receiving and/or transferring battery cell.

Additionally and/or alternatively, it is noted that alternative thresholds, other than for remediation, can be employed to identify a subset of battery cells for an EV to EV electric charge transfer. These can include optimization for balancing charge (e.g., achieving a common charge level) across one or more, such as all, units (battery cells/battery packs), optimization for achieving higher performance by first using units having higher charge, and/or optimization for bypassing one or more battery cells such as based on a present low state of charge and/or state of health.

In one or more additional and/or alternative embodiments, a specified threshold for battery cell performance can be defined by metrics that are in addition to states of health and states of charge for the plurality of battery cells, such as comprising battery cell size, battery cell couplings, discharge speed, charge speed, and/or available charge storage capacity.

Figure 8:
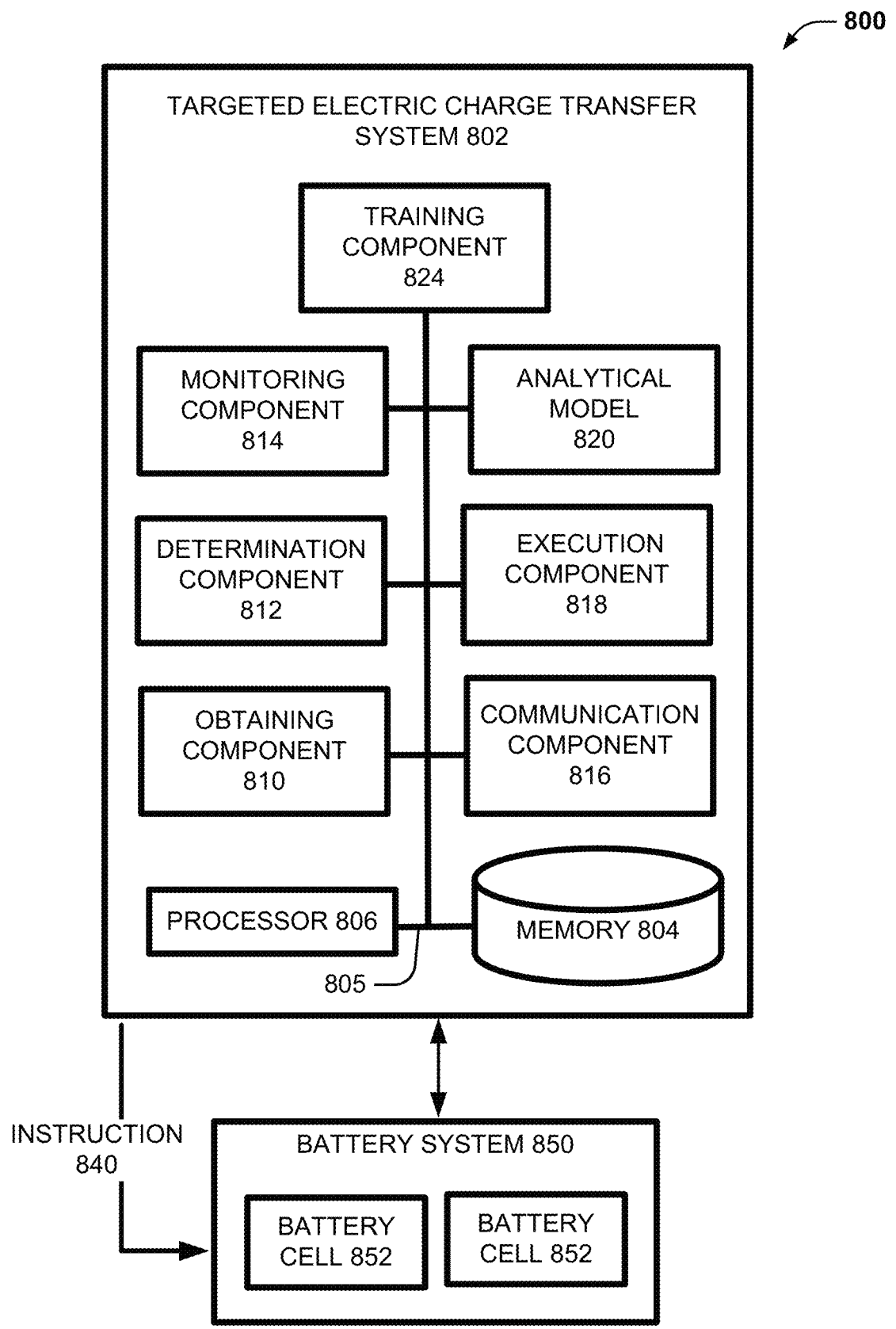
FIG. 8 illustrates another electric charge transfer system, in accordance with one or more embodiments described herein.

Turning next to FIG. 8, illustrated is a non-limiting architecture 800 comprising a targeted electric charge transfer system 802. Repetitive description of like elements employed in one or more other embodiments described herein is omitted for sake of brevity. Description relative to an embodiment of FIG. 7 can be applicable to an embodiment of FIG. 8. Likewise, description relative to an embodiment of FIG. 8 can be applicable to an embodiment of FIG. 7.

Generally, the targeted electric charge transfer system 802, and thus non-limiting system 800, can facilitate selection of a battery cell, based on a threshold for remediation, to continue to use such that the battery cell (or battery cells) is degraded towards end of life of the battery cell. The battery system 850 can comprise a plurality of battery cells 852. In one or more embodiments, at least a guidance controller can be comprised by the targeted electric charge transfer system 802. Generally, targeted electric charge transfer system 802 can be located at any suitable location of an electric vehicle having the battery system 850.

One or more communications between one or more components of the non-limiting system 800 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The targeted electric charge transfer system 802 can be associated with, such as accessible via, a cloud computing environment.

Generally, the targeted electric charge transfer system 802 can comprise any suitable type of component, machine, device, facility, apparatus and/or instrument that comprises a processor and/or can be capable of effective and/or operative communication with a wired and/or wireless network. All such embodiments are envisioned. For example, the targeted electric charge transfer system 802 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the targeted electric charge transfer system 802 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The targeted electric charge transfer system 802 can comprise a plurality of components. The components can comprise a memory 804, processor 806, bus 805, obtaining component 810, determination component 812, monitoring component 814, communication component 816, execution component 818, analytical model 820 and/or training component 824.

Discussion first turns briefly to the processor 806, memory 804 and bus 805 of the targeted electric charge transfer system 802. For example, in one or more embodiments, the targeted electric charge transfer system 802 can comprise the processor 806 (e.g., computer processing unit, microprocessor, classical processor and/or like processor). In one or more embodiments, a component associated with targeted electric charge transfer system 802, as described herein with or without reference to the one or more figures of the one or more embodiments, can comprise one or more computer and/or machine readable, writable and/or executable components and/or instructions that can be executed by processor 806 to provide performance of one or more processes defined by such component and/or instruction. In one or more embodiments, the processor 806 can comprise the obtaining component 810, determination component 812, monitoring component 814, communication component 816, execution component 818, analytical model 820 and/or training component 824.

In one or more embodiments, the targeted electric charge transfer system 802 can comprise the computer-readable memory 804 that can be operably connected to the processor 806. The memory 804 can store computer-executable instructions that, upon execution by the processor 806, can cause the processor 806 and/or one or more other components of the targeted electric charge transfer system 802 (e.g., obtaining component 810, determination component 812, monitoring component 814, communication component 816, execution component 818, analytical model 820 and/or training component 824) to perform one or more actions. In one or more embodiments, the memory 804 can store computer-executable components (e.g., obtaining component 810, determination component 812, monitoring component 814, communication component 816, execution component 818, analytical model 820 and/or training component 824).

The targeted electric charge transfer system 802 and/or a component thereof as described herein, can be communicatively, electrically, operatively, optically and/or otherwise coupled to one another via a bus 805. Bus 805 can comprise one or more of a memory bus, memory controller, peripheral bus, external bus, local bus and/or another type of bus that can employ one or more bus architectures. One or more of these examples of bus 805 can be employed.

In one or more embodiments, the targeted electric charge transfer system 802 can be coupled (e.g., communicatively, electrically, operatively, optically and/or like function) to one or more external systems (e.g., a non-illustrated electrical output production system, one or more output targets and/or an output target controller), sources and/or devices (e.g., classical, communication devices and/or like devices), such as via a network. In one or more embodiments, one or more of the components of the targeted electric charge transfer system 802 and/or of the non-limiting system 800 can reside in the cloud, and/or can reside locally in a local computing environment (e.g., at a specified location).

In addition to the processor 806 and/or memory 804 described above, the targeted electric charge transfer system 802 can comprise one or more computer and/or machine readable, writable and/or executable components and/or instructions that, when executed by processor 806, can provide performance of one or more operations defined by such component and/or instruction.

Turning now to the additional components of the targeted electric charge transfer system 802 (e.g., obtaining component 810, determination component 812, monitoring component 814, communication component 816, execution component 818, analytical model 820 and/or training component 824), generally, the targeted electric charge transfer system 802 can obtain and analyze data defining battery cells of an electric vehicle to make one or more decisions regarding electric charge transfer using the battery cells.

Turning first to the monitoring component 814, this component can operably couple to a battery cell local controller, global controller and/or BMS to obtain data regarding operation of the battery cells 852 of the battery system 850. This data can comprise any of swelling, temperature, current/voltage input/output, material composition, and/or current charge level, without being limited thereto. Additionally and/or alternatively, the information can comprise cell size, cell couplings and/or total cell charge capacity.

Additionally and/or alternatively, the information can comprise historical information for any of these aspects, for state of health (SOH) and/or for state of charge (SOC). Based on this data, a current SOH and/or SOC for one or more battery cells of the battery system 850 can be determined by the monitoring component 814.

Turning next to the obtaining component 810, this component can identify, search, receive, transfer and/or otherwise obtain information defining states of the battery cells of the battery system 850. This information can be obtained from the monitoring component 814 and/or from a battery cell local controller, global controller, and/or BMS associated with the battery system 850. The information can comprise data and/or metadata in any suitable form/format. In one or more embodiments, the obtaining component 810 further can obtain logged recent and/or historical information from one or more knowledge databases operably coupled to the targeted electric charge transfer system 802.

In one or more embodiments, the obtaining component 810 also can receive a notification of low charge of the battery system 850. This notification can be provided, for example, by a vehicle central controller and/or a BMS of the battery system 850.

Turning now to the determination component 812, this component can identify, based on a comparison of metrics to historical metrics for vehicle performance, a current event that is defined by the metrics as leading to degradation of a plurality of battery cells of a vehicle system. For example, metrics can define current increased usage of battery cells, change in temperature and/or change in swelling. These metrics can represent extreme external temperature changes. Additionally and/or alternatively, metrics can define and/or represent high driving speeds, prolonged driving and/or unusual driving (e.g., repetitive stop and go). These metrics can represent user entity decisions in driving, such as how the vehicle is being driven.

Additionally and/or alternatively, metrics, such as current and/or historical metrics can be obtained from a source that is external to the energy charge transfer system 802. Such external source can comprise a source of weather information, social media information and/or user entity communication information.

In an example, weather metrics can be obtained from a weather application, such as by a cloud connection to the weather application. The weather metrics can define extreme heat over a prolonged range of time.

In another example, social media metrics can be obtained from a social media application, such as by a cloud connection to the social media application. The social media metrics can define a past occurrence (e.g., past event) of extreme driving, such as at high speeds, such as based on event notifications (e.g., for a race and/or drag race).

In still another example, communication metrics can be obtained from a communication application, such as by a cloud connection to the social media application. In an example, communications can be obtained from a mobile device that is operatively coupled to the energy charge transfer system 802. The communication metrics can define a past occurrence (e.g., past event) of extreme driving, such as at high speeds, such as based on emergency communications obtained.

The aforementioned data can be obtained from any suitable knowledge database and/or other source (e.g., external source) that can be accessible to the targeted energy charge transfer system 802, whether directly or indirectly. For example, in one or more cases, a mobile device can be operatively coupled to the targeted energy charge transfer system 802, such as a cell phone and/or tablet.

In one or more cases, historical metrics can be compared to the current metrics, such as where past change in battery cell temperature, change in battery cell swelling, prolonged riving and/or high driving speeds led to degradation of one or more battery cells. Based on the comparison, such as by the determination component 812, it can be confirmed that the current metrics define a current event, and/or predict an event to occur, that has in the past and/or is likely to lead to degradation of one or more battery cells of the battery system 850.

In response to the identification of such current event (e.g., immediate and/or predicted event), an alert can be triggered by the determination component 812, to be sent, such as by the determination component 812, to the energy charge transfer system 802 and/or to the user entity. To send to the user entity, a display and/or mobile device can be employed, such as that is operatively coupled to the vehicle 801.

In response to the alert, the user entity can determine to proceed with the degradation and can override the alert. In such case, the alert decision (e.g., override decision) can be communicated to the energy charge transfer system 802, such as address the degradation.

That is, in response to the notification of low charge of the battery system 850, and/or in response to the alert/identification of a current event defined as leading to degradation of a plurality of battery cells of the battery system, the determination component 812 can be triggered to determine whether or not to respond to, perform an action in response to, and/or override the notification and/or identification of a current event.

For example, in response to the notification of low charge of the battery system 850, and/or in response to identification of a current event defined as leading to degradation of a plurality of battery cells of the battery system, the determination component 812 can be triggered to identify a subset of battery cells 852 of the battery system 850 to employ for receiving an electric charge transfer.

Also in response to the aforementioned notification and/or current event identification, the determination component 812 can be triggered to broadcast a request for the electric charge. This broadcast can be facilitated by any suitable device of the communication component 816 and/or of the electric vehicle comprising the targeted electric charge transfer system 802. This broadcast can be facilitated by any third party system, such as a radio network and/or a system configured for sending/receiving broadcasts for requests for and/or offers for electric charge transfers.

The determination component 812 can generally, based on data defining the battery cells 852 and/or defining a proposed electric charge transfer (e.g., charging speed), identify a subset of the plurality of battery cells 852. The subset can be identified as being beyond a threshold for remediation. As used herein, this can refer to the battery cell or battery cells of the subset being unable to be remediated (e.g., repaired, fix, refreshed to 100% health). It is appreciated that for sake of brevity, discussion provided above relative to the determination component 712 of FIG. 7 also is applicable here to the determination component 812.

For example, the threshold for remediation can be based on historical cell states or metrics for the plurality of battery cells and/or for other battery cells having been used at the respective electric vehicle or targeted electric charge transfer system 802. Historical data can be stored at any suitable location, such as a knowledge data base internal to or external to the targeted electric charge transfer system. The historical cell state data can be aggregated and/or data for similar types of battery cells, size of battery cells and/or similar degradation profiles can be employed.

In an embodiment, to specify a threshold for remediation, historical data regarding battery metrics before and after remediation can be employed to determine a threshold beyond which remediation is not possible, or does not result in a specified maximum charge level, for example.

In an embodiment, the current cell state data can be compared (e.g., by the determination component 812) to expected data, such as expected temperatures and/or charge levels. Where at least a specified deviation (e.g., deviation threshold) is present between current and expected values, the cells can be determined as failing to at least a minimum threshold such as to be further analyzed as compared to the threshold for remediation. Additionally and/or alternatively, battery cells having been determined (e.g., by the determination component 812) to not meet a threshold for remediation, such additional comparison against expected values/metrics can be executed, such as to further narrow to a subset of one or more battery cells to continue to use (e.g., as directed by the execution component 818), such that the subset degrades towards end of life of the subset.

In an embodiment, such additional comparison can employ one or more additional specified thresholds for battery cell performance defined by metrics that are in addition to states of health and states of charge for the plurality of battery cells, wherein the metrics comprise battery cell size, couplings, discharge speed, charge speed or available storage capacity.

Ultimately, based on the threshold for remediation, and/or on one or more additional comparisons and/or specified thresholds, the determination component 812 can identify a subset of the plurality of battery cells that is to be recommended for continued use such that the subset degrades towards end of life of the subset. Based on this identification, the determination component 812 and/or execution component 818 can issue an instruction, such as to the battery system 850, to use the subset.

Additionally and/or alternatively, in response to the subset (e.g., one or more battery cells 852) being identified as being beyond the threshold for remediation, the execution component 818 can initiate a charge of the subset. The charge can, due to the state of health of the subset, comprise energy transfer at the subset such that the subset degrades towards end of life of the subset. That is, the subset itself is beyond a threshold for remediation, and thus further use can further damage the subset. It is appreciated that for sake of brevity, discussion provided above relative to the execution component 718 of FIG. 7 also is applicable here to the execution component 818.

In addition to the above-provided description relative to the determination component 712, the determination component 812 also can identify a second subset of battery cells of the battery system 850 that are not beyond the threshold for remediation. Based on this identification, the determination component 812 and/or execution component 818 can issue an instruction, such as to the battery system 850, to cease use of the second subset for the electric charge transfer, such that the second subset is not degraded towards end of life of the second subset.

Further, where the subset has been identified for purposes of EV to EV charging (e.g., to be a charge transferring or charge receiving subset), the execution component 818 can conduct one or more verifications that conditions for initiating the charge are met. These conditions can comprise, and are not limited to, charge speed, whether a battery cell of the battery system 850 is available within one or more thresholds to receive the charge, whether the electric vehicles proposing to participate can facilitate meeting to execute the electric charge transfer and/or whether the charge transferring vehicle has adequate charge to transfer.

In response to the verifying, by the execution component 818, that the conditions for charging are met, an instruction can be communicated, by any suitable means, to the electric vehicle, such as to an electric vehicle central controller, to route to the other electric vehicle providing the electric charge transfer. In response, the electric vehicle can perform any one or more operations defined above relative to FIGS. 4-6, to thus position the electric vehicle for receiving the electric charge transfer.

In response to a notification, such as from a respective charge coupling alignment system and/or positioning system (e.g., guidance control system 406), the execution component 818 can communicate an instruction 840 to initiate the electric charge transfer. This electric charge transfer can be facilitated using physical charge couplings (e.g., plugs, adapters, wires and/or cables) and/or using wireless charging couplings (e.g., inductive coupling plates, wireless charging plates and/or laser-based charging adapters).

In one or more embodiments, the determination component 812 and/or execution component 818 can be at least partially facilitated by an analytical model, such as the analytical model 820. The analytical model 820 can comprise and/or can be comprised by a classical model, predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, self-supervised, semi-supervised and/or unsupervised.

For example, the analytical model 820 can employ and/or comprise a machine learning (ML) model that can learn to automatically select a subset of battery cells. In one or more embodiments, such a machine learning model can comprise a machine learning model based on artificial intelligence (AI) including, but not limited to, a shallow or deep neural network model, a support vector machine (SVM) model, a classifier, a decision tree classifier, a regression model, and/or any supervised or unsupervised machine learning model.

In one or more embodiments, the analytical model 820 can learn, and/or access from a knowledge database, the monitoring component 814, the obtaining component 810 and/or other database, the particulars of related to electric charge transfer using the battery system 850. For example, based on learning such one or more operating conditions and/or cause and effect conditions, the processor 806 further can employ the one or more ML and/or AI models to perform one or more tasks including, but not limited to, making a prediction, making an estimation (e.g., of cell capacity or of active cell material), classifying data, implementing one or more monitoring and/or control operations of a battery system controller, and/or another task.

Generally, the analytical model 820 can be trained, such as by the training component 824, on a set of training data that can represent the type of data for which the analytical model 820 will be used. Checks of the analytical model 820, such as relative to new, conventional and/or popular configurations and/or constraints thereof, can be performed periodically and/or at any other frequency. Re-training of the analytical model 820 can be performed employing up-to-date data collected from one or more knowledge databases and/or from the execution component 818, such as over a specified time window. For example, the training component 824 can train the analytical model 820 upon determination of a new setting and/or implementation of a new BMS or battery cell.

For example, the analytical model 820 can be employed to analyze current battery cell metrics, historical battery cell metrics and/or other relevant data to determine the threshold for remediation and/or other battery cell metric specified threshold. The analytical model 820 can be employed to further classify the subset of identified battery cells for use, charging and/or discharging, such as based on the one or more comparisons and/or other specified thresholds described above.

In one or more embodiments, the training component 824 can facilitate receipt of feedback from a user entity and/or administrator entity, such as employing a suitable display device. Using this feedback, one or more settings and/or thresholds (e.g., threshold for remediation) can be updated.

It is appreciated that although discussion herein refers to a targeted electric charge transfer system 802 of a charge receiving electric vehicle, discussion herein both above and below also is applicable to a charge transferring electric vehicle.

Figure 9:
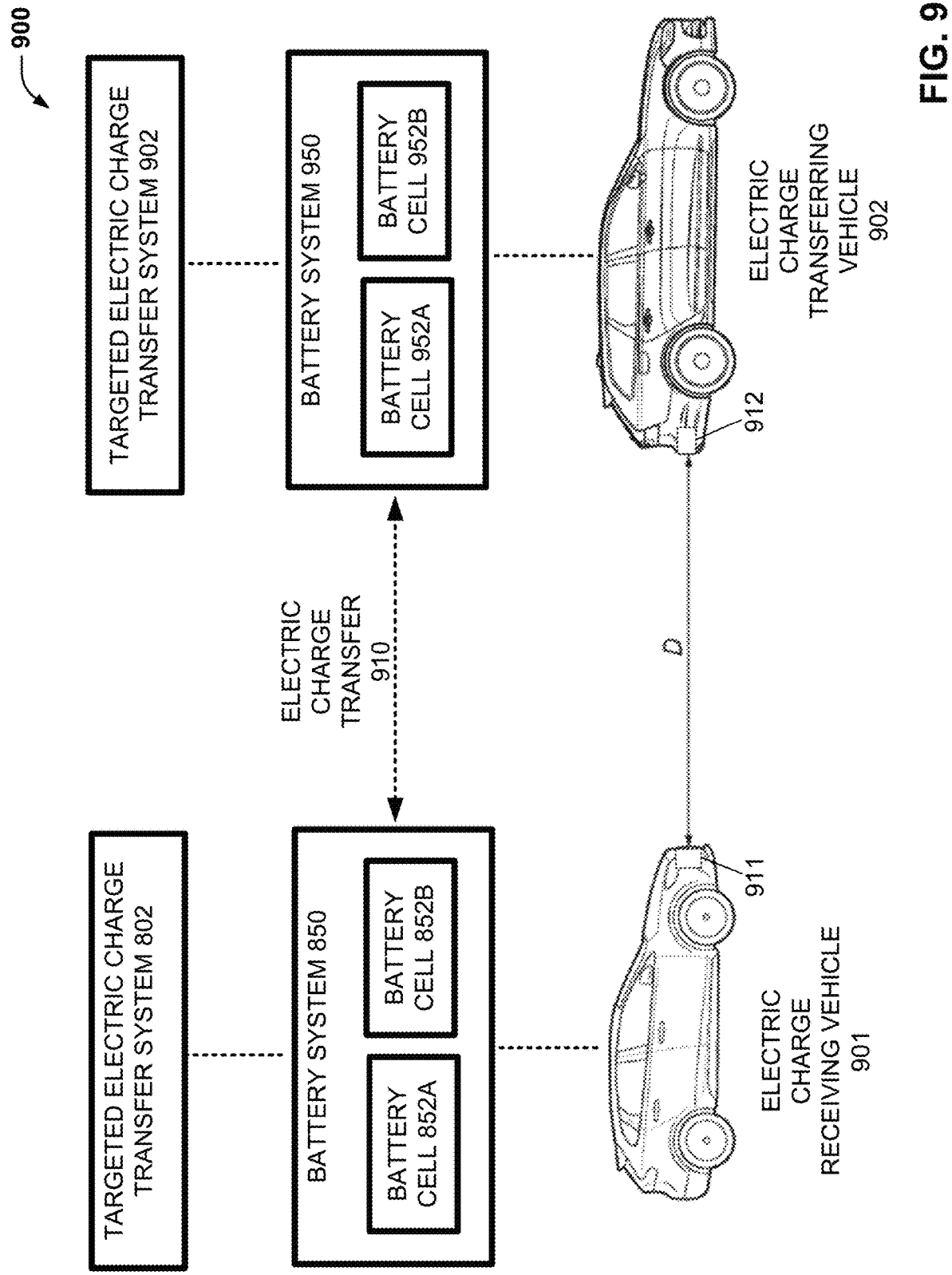
FIG. 9 illustrates a schematic of an electric charge transfer between two electric vehicles, facilitated by the targeted electric charge transfer system of FIG. 8, in accordance with one or more embodiments described herein.

For example, turning to the schematic 900 of FIG. 9, an EV to EV charge can comprise an electric charge transfer 910 executed between at least a pair of electric vehicles 901 and 902. As illustrated, the electric vehicle 901 can be the electric charge receiving vehicle and the electric vehicle 902 can be the electric charge transferring vehicle 902. In one or more other embodiments, an additional electric charge receiving vehicle and/or an electric charge transferring vehicle 902 can be included in a same electric charge transfer 910.

As illustrated one or both of the participating electric vehicles 901 and 902 can comprise a targeted electric charge transfer system 802, 902 for facilitating an electric charge transfer using the respective charge couplings 911, 912. That is, referring to the electric charge transferring vehicle 902, a respective targeted electric charge transfer system 902 can comprise an determination component that can be triggered to identify a subset of battery cells 952 of the battery system 950 employ for the electric charge transfer 910. Selection can be made based on any one or more criterion discussed above relative to the determination components 712, 812.

Likewise, a respective communication component can, differently than broadcasting a request for charge, broadcast an availability to charge. Such notification can comprise a proposed charging speed, charging method (e.g., physical and/or wireless), meeting location, amount of available charge and/or time to execute the charge.

Further operations of respective monitoring, obtaining and execution components, and/or analytical models, of the targeted electric charge transfer system 902 can be the same and/or similar to those described above relative to the targeted electric charge transfer system 702, 802.

Figure 10:
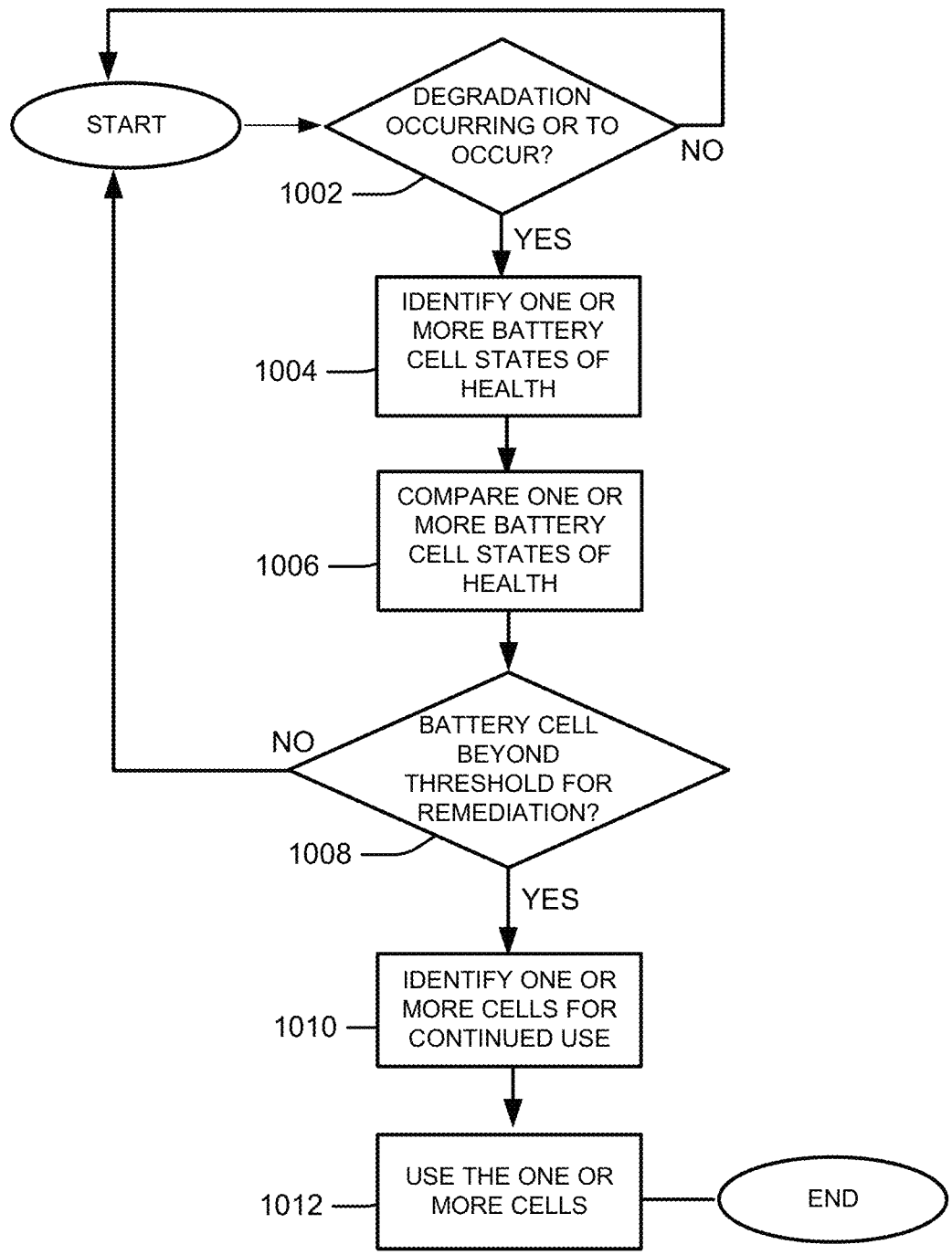
FIG. 10 illustrates a process flow for facilitating electric charge transfer by the electric charge transfer system of FIG. 8, in accordance with one or more embodiments described herein.

Turning now to FIG. 10, illustrated is a flow diagram of an example, non-limiting system-implemented method 1000 that can facilitate using, charging one or more units (e.g., cells and/or multi-cell clusters) and/or discharging one or more units (e.g., cells and/or multi-cell clusters) in a selectively determined order based on SOC monitoring, in accordance with one or more embodiments described herein. Repetitive description of like elements employed in one or more other embodiments described herein is omitted for sake of brevity.

At 1002, the system-implemented method 1000 can comprise determining, by a system operatively coupled to processor (e.g., determination component 812), whether a degradation of a battery cell is occurring or predicted to occur. For example, the determination can be of whether a degradation event is occurring or predicted to occur, such as based on any one or more aspects of historical data discussed above. If no, the system-implemented method 1000 proceeds back to Start. If yes, the system-implemented method 1000 proceeds to step 1004.

At 1004, the system-implemented method 1000 can comprise identifying, by the system (e.g., determination component 812) one or more states of health of battery cells of the primary power source.

At 1006, the system-implemented method 1000 can comprise comparing, by the system (e.g., determination component 812) the one or more states of health of battery cells of the primary power source.

At 1008, the system-implemented method 1000 can comprise determining, by the system (e.g., determination component 812) if one or more battery cells presently have a degraded state of health and is beyond a threshold for remediation. If no, the system-implemented method 1000 proceeds back to Start. If yes, the system-implemented method 1000 proceeds to step 1010.

At 1010, the system-implemented method 1000 can comprise identifying, by the system (e.g., determination component 812) the one or more degraded battery cell for continued use, such as to degrade the battery cell towards end of the life of the one or more battery cells.

At 1012, the system-implemented method 1000 can comprise using, by the system (e.g., execution component 818) the one or more degraded battery cell use, such as to degrade the battery cell towards end of the life of the one or more battery cells.

Figure 11:
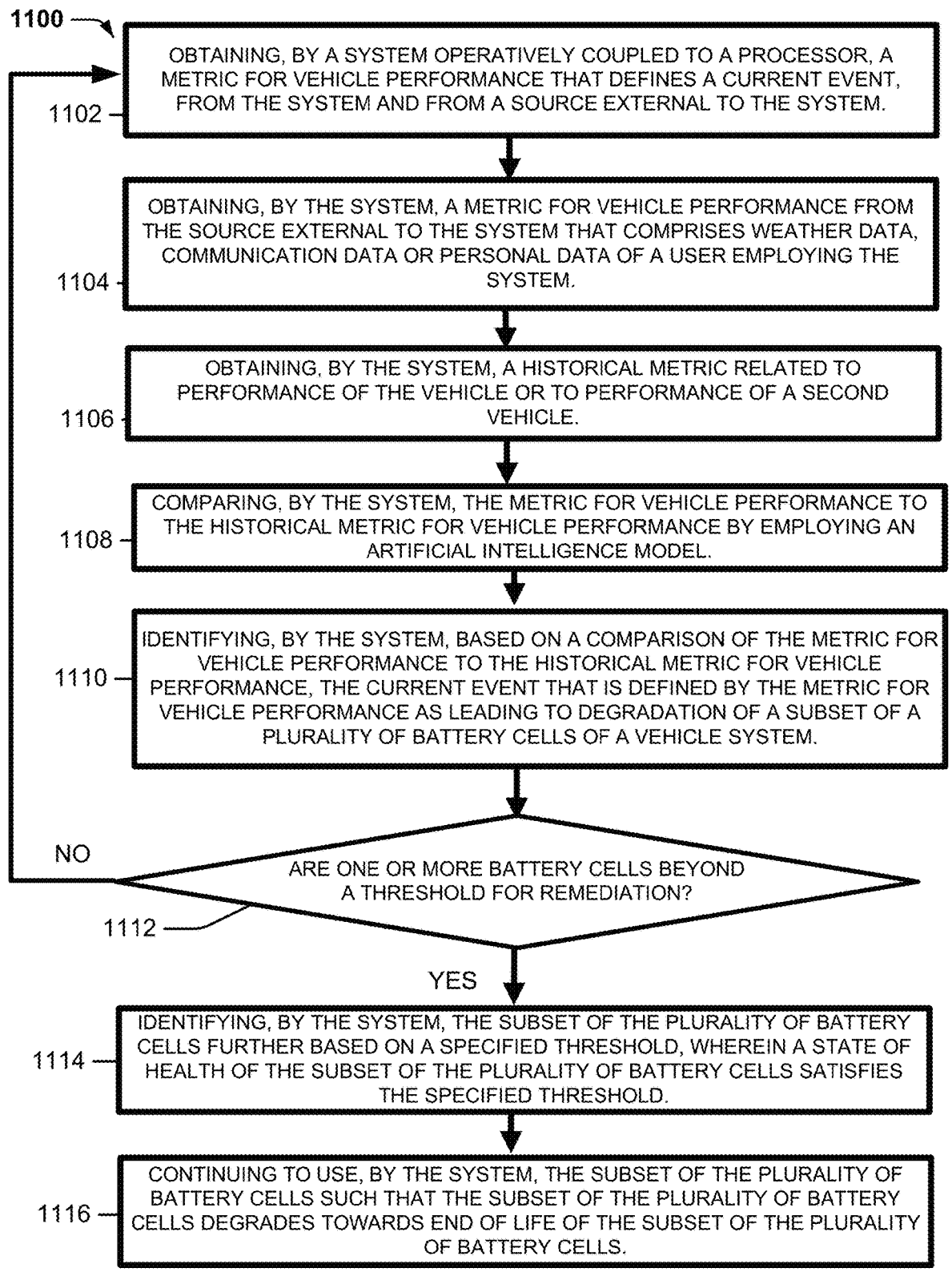
FIG. 11 illustrates still another process flow for facilitating electric charge transfer by the electric charge transfer system of FIG. 8, in accordance with one or more embodiments described herein.

Turning now to FIG. 11, illustrated is a flow diagram of an example, non-limiting system-implemented method 1100 that can facilitate using, charging one or more nits (e.g., cells and/or multi-cell clusters) and/or discharging one or more units (e.g., cells and/or multi-cell clusters) in a selectively determined order based on SOC monitoring, in accordance with one or more embodiments described herein. Repetitive description of like elements employed in one or more other embodiments described herein is omitted for sake of brevity.

At 1102, the system-implemented method 1100 can comprise obtaining, by a system operatively coupled to processor (e.g., obtaining component 810), a metric for vehicle performance that define a current event, from the system or from a source external to the system.

At 1104, the system-implemented method 1100 can comprise obtaining, by the system (e.g., obtaining component 810), a metric from the source external to the system that comprises weather data, communication data or personal data of a user employing the system.

At 1106, the system-implemented method 1100 can comprise obtaining, by the system (e.g., obtaining component 810), a historical metric related to performance of the vehicle or to performance of a second vehicle.

At 1108, the system-implemented method 1100 can comprise comparing, by the system (e.g., determination component 812), the metric for vehicle performance to the historical metric for vehicle performance by employing an artificial intelligence model.

At 1110, the system-implemented method 1100 can comprise identifying, by the system (e.g., determination component 812), based on a comparison of the metric for vehicle performance to the historical metric for vehicle performance, the current event that is defined by the metric for vehicle performance as leading to degradation of a subset of a plurality of battery cells of a vehicle system.

At 1112, the system-implemented method 1100 can comprise determining, by the system (e.g., determination component 812), whether one or more battery cells, of the plurality of battery cells, are beyond the threshold for remediation. Where the answer is yes, the system-implemented method 1100 proceeds to step 1114. Where the answer is no, the system-implemented method 1100 proceeds back to step 1102.

At 1114, the system-implemented method 1100 can comprise identifying, by the system (e.g., determination component 812) the subset of the plurality of battery cells further based on a specified threshold, wherein a state of health of the subset of the plurality of battery cells satisfies the specified threshold. In one or more embodiments, the specified threshold can further be defined by vehicle performance, subset performance, battery warranty or subset replacement cost.

At 1116, the system-implemented method 1100 can comprise continuing to use, by the system (e.g., execution component 818), the subset of the plurality of battery cells such that the subset of the plurality of battery cells degrades towards end of life of the subset of the plurality of battery cells.

In still another step, the system-implemented method 1100 can comprise identifying, by the system (e.g., determination component 812), a second subset of the plurality of battery cells, wherein the second subset of the plurality of battery cells is not beyond the threshold for remediation, and ceasing, by the system (e.g., execution component 818), to use the second subset of the plurality of battery cells for the charge such that the second subset is not degraded towards end of life of the second subset of the plurality of battery cells.

For simplicity of explanation, the methodologies, such as computer-implemented methodologies, provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. Furthermore, not all illustrated acts can be utilized to implement the methodologies in accordance with the described subject matter. In addition, those skilled in the art will understand and appreciate that the methodologies could alternatively be represented as a series of interrelated states via a state diagram or events. Additionally, it should be further appreciated that the methodologies described hereinafter and throughout this specification are capable of being stored on an article of manufacture to facilitate transporting and transferring the methodologies to computers. The term article of manufacture, as used herein, is intended to encompass a computer program accessible from any computer-readable device or storage media.

In summary, one or more embodiments described herein can facilitate electric charge transfer to/from one or more battery cells and/or multi-cell battery packs of an electric vehicle from a second electric vehicle, based at least in part on state of charge and/or state of health monitoring at one or more of the cell-level or pack-level. An exemplary method can comprise identifying, by a system operatively coupled to a processor, based on a comparison of a metric for vehicle performance to a historical metric for vehicle performance, a current event that is defined by the metric for vehicle performance as leading to degradation of a plurality of battery cells of a vehicle system, upon identifying the current event, determining, by the system, a subset of the plurality of battery cells that is beyond a threshold for remediation, and continuing to use, by the system, the subset of the plurality of battery cells such that the subset of the plurality of battery cells degrades towards end of life of the subset of the plurality of battery cells.

The one or more innovations, frameworks, systems, devices and/or methods described herein can be additionally, and/or alternatively described as follows:

A system can comprise a memory that stores computer executable components, and a processor that executes the computer executable components stored in the memory, wherein the computer executable components are executable to perform operations. The operations comprise identifying, based on a comparison of a metric for vehicle performance to a historical metric for vehicle performance, a current event that is defined by the metric for vehicle performance as leading to degradation of a plurality of battery cells of a vehicle system, upon identifying the current event, determining a subset of the plurality of battery cells that is beyond a threshold for remediation, and continuing to use the subset of the plurality of battery cells such that the subset of the plurality of battery cells degrades towards end of life of the subset of the plurality of battery cells.

The system of any the above paragraph can further comprise comparing the metric for vehicle performance to the historical metric for vehicle performance by employing an artificial intelligence model.

Relative to the system of any one or more of the above paragraphs, the metric for vehicle performance defining the current event comprises a metric obtained from the system or from a source external to the system.

Relative to the system of the above paragraph, optionally, the metric obtained from the source comprise weather data, communication data or personal data of a user employing the system.

Relative to the system of any one or more of the above paragraphs, the historical metric for vehicle performance is related to performance of the vehicle or of a second vehicle.

Relative to the system of any one or more of the above paragraphs, continuing to use the subset of the plurality of battery cells comprises continuing to discharge the subset of the plurality of battery cells or continuing to charge the subset of the plurality of battery cells.

The system of any one or more of the above paragraphs can further comprise monitoring temperatures and charge levels of the plurality of battery cells, and comparing the temperatures and charge levels to expected temperatures and expected charge levels of the plurality of battery cells.

The system of any one or more of the above paragraphs can further comprise identifying the subset of the plurality of battery cells further based on a specified threshold, wherein a state of health of the subset of the plurality of battery cells satisfies the specified threshold.

Relative to the system of the above paragraph, optionally, the specified threshold is further defined by vehicle performance, subset performance, battery warranty or subset replacement cost.

The system of any one or more of the above paragraphs can further comprise identifying a second subset of the plurality of battery cells that is not beyond the threshold for remediation, and ceasing to use the second subset of the plurality of battery cells such that the other subset is not degraded towards end of life of the second subset of the plurality of battery cells.

A method can comprise identifying, by a system operatively coupled to a processor, based on a comparison of a metric for vehicle performance to a historical metric for vehicle performance, a current event that is defined by the metric for vehicle performance as leading to degradation of a plurality of battery cells of a vehicle system, upon identifying the current event, determining, by the system, a subset of the plurality of battery cells that is beyond a threshold for remediation, and continuing to use, by the system, the subset of the plurality of battery cells such that the subset of the plurality of battery cells degrades towards end of life of the subset of the plurality of battery cells.

The method of the aforementioned paragraph can further comprise comparing, by the system, the metric for vehicle performance to the historical metric for vehicle performance by employing an artificial intelligence model.

Relative to the method of any one or more of the aforementioned paragraphs, the metric for vehicle performance defining the current event comprises a metric obtained from the system or from a source external to the system.

Relative to the method of the aforementioned paragraph, optionally, the source comprise weather data, communication data or personal data of a user employing the system.

Relative to the method of any one or more of the aforementioned paragraphs, continuing to use the subset of the plurality of battery cells comprises continuing to discharge the subset of the plurality of battery cells or continuing to charge the subset of the plurality of battery cells.

The method of any one or more of the aforementioned paragraphs can further comprise identifying, by the system, the subset of the plurality of battery cells further based on a specified threshold, wherein a state of health of the subset of the plurality of battery cells satisfies the specified threshold.

The method of any one or more of the aforementioned paragraphs can further comprise identifying, by the system, a second subset of the plurality of battery cells that is not beyond the threshold for remediation, and ceasing to use, by the system, the second subset of the plurality of battery cells such that the second subset of the plurality of battery cells is not degraded towards end of life of the second subset of the plurality of battery cells.

A non-transitory, machine-readable medium can comprise executable instructions that, when executed by a processor, facilitate performance of operations. The operations comprise identifying, by the processor, based on a comparison of a metric for vehicle performance to a historical metric for vehicle performance, a current event that is defined by the metric for vehicle performance as leading to degradation of a plurality of battery cells of a vehicle system, upon identifying the current event, determining, by the processor, a subset of the plurality of battery cells that is beyond a threshold for remediation, and continuing to use, by the processor, the subset of the plurality of battery cells such that the subset of the plurality of battery cells degrades towards end of life of the subset of the plurality of battery cells.

The non-transitory, machine-readable medium of the above paragraph further can facilitate performance of an operation comprising comparing, by the processor, the metric for vehicle performance to the historical metric for vehicle performance by employing an artificial intelligence model.

Relative to the non-transitory, machine-readable medium of any one or more of the above paragraphs, the metric for vehicle performance defining the current event comprises a metric obtained from a source external to the system, and wherein the metric obtained from the source comprises weather data, communication data or personal data of a user employing the system.

Relative to the non-transitory, machine-readable medium of any one or more of the above paragraphs, continuing to use the subset of the plurality of battery cells comprises continuing to discharge the subset of the plurality of battery cells or continuing to charge the subset of the plurality of battery cells.

The non-transitory, machine-readable medium of any one or more of the above paragraphs further can facilitate performance of operations comprising identifying, by the processor, the subset of the plurality of battery cells further based on a specified threshold, wherein a state of health of the subset of the plurality of battery cells satisfies the specified threshold.

An advantage of the aforementioned system, method and/or non-transitory, machine-readable medium discussed above can be an ability to identify one or more battery cells for targeted degradation, such as to limit degradation, remediation costs and/or replacement costs to only a subset of battery cells of an electric vehicle.

Another advantage of the aforementioned system, method and/or non-transitory, machine-readable medium discussed above can be an ability to identify one or more battery cells for targeted degradation, such as to allow degradation. For example, an electric vehicle can be in a position to be used, and thus powered, regardless of whether a battery cell is degraded, and thus it can be desired to allow degradation of a select few battery cells. That is, it can be desired to allow greater degradation of a select one or more battery cells, as compared to allowing lesser depredation of a greater number of battery cells. Further, this can allow for targeted remediation costs and/or replacement costs to only a subset of battery cells of an electric vehicle. This can also allow for optimization of battery cell use of the subset, such as using battery cells having greater state of health or state of charge to optimize performance of one or more vehicle systems.

Still another advantage of the aforementioned system, method and/or non-transitory, machine-readable medium discussed above can be an ability to optimize use of battery cells for optimum performance. For example, differently, a targeted battery cell can be one with a high state of health, such as where a high performing battery cell is desired to be used for the charge, to thus get an electric vehicle the "last mile" to its destination.

Yet another advantage of the aforementioned system, method and/or non-transitory, machine-readable medium discussed above can be an ability to selectively control use of different battery cells relative to different speeds of charge. That is, different speeds of charge can have different effects on battery cells in general. A higher speed quick charge can reduce a life of a battery cell to a greater extent than a lower speed trickle charge.

In one or more embodiments of the aforementioned system, method and/or non-transitory, machine-readable medium, an analytical model, such as an artificial intelligence model, can perform one or more operations. These operations can comprise comparison of battery cell states of health and/or states of charge, automatic selection of a battery cell for use in an electric charge transfer based on preset thresholds, and/or use of historical data to predict a result of an electric charge transfer on a battery cell. An advantage of this can be an ability to quickly and accurately facilitate an electric charge transfer, such as in response to a low charge warning and/or notification of available electric charge transfer.

Indeed, in view of the one or more embodiments described herein, a practical application of the systems, computer-implemented methods, and/or computer program products described herein can be a reduction in degradation of a selection of battery cells of an electric vehicle and/or a more efficient process to realizing electric charge transfer between electric vehicles. Overall, such computerized tools can constitute a concrete and tangible technical improvement in the fields of electric vehicles and electric vehicle battery systems, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as related to monitoring states of battery cells of an electric vehicle and analyzing those states to make a selection as to a subset of the battery cells to use for an electric charge transfer, such as between electric vehicles, as compared to existing systems and/or techniques lacking such approach(es). Systems, computer-implemented methods, and/or computer program products providing performance of these processes are of great utility in the fields of electric vehicles and electric vehicle battery systems and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically manage raw battery cell data to generate states of health or states of charge, and/or analyze such data to execute an electric charge transfer, such as between electric vehicles, as the one or more embodiments described herein can provide. Further, a human, or even thousands of humans, cannot efficiently, accurately, and/or effectively use an AI, NN, ML and/or DL model to perform one or more of the aforementioned operations, as the one or more embodiments described herein can provide. And, neither can the human mind nor a human with pen and paper electronically effectively electronically perform one or more of the aforementioned processes, as conducted by one or more embodiments described herein.

In one or more embodiments, one or more of the processes and/or frameworks described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

Figure 12:
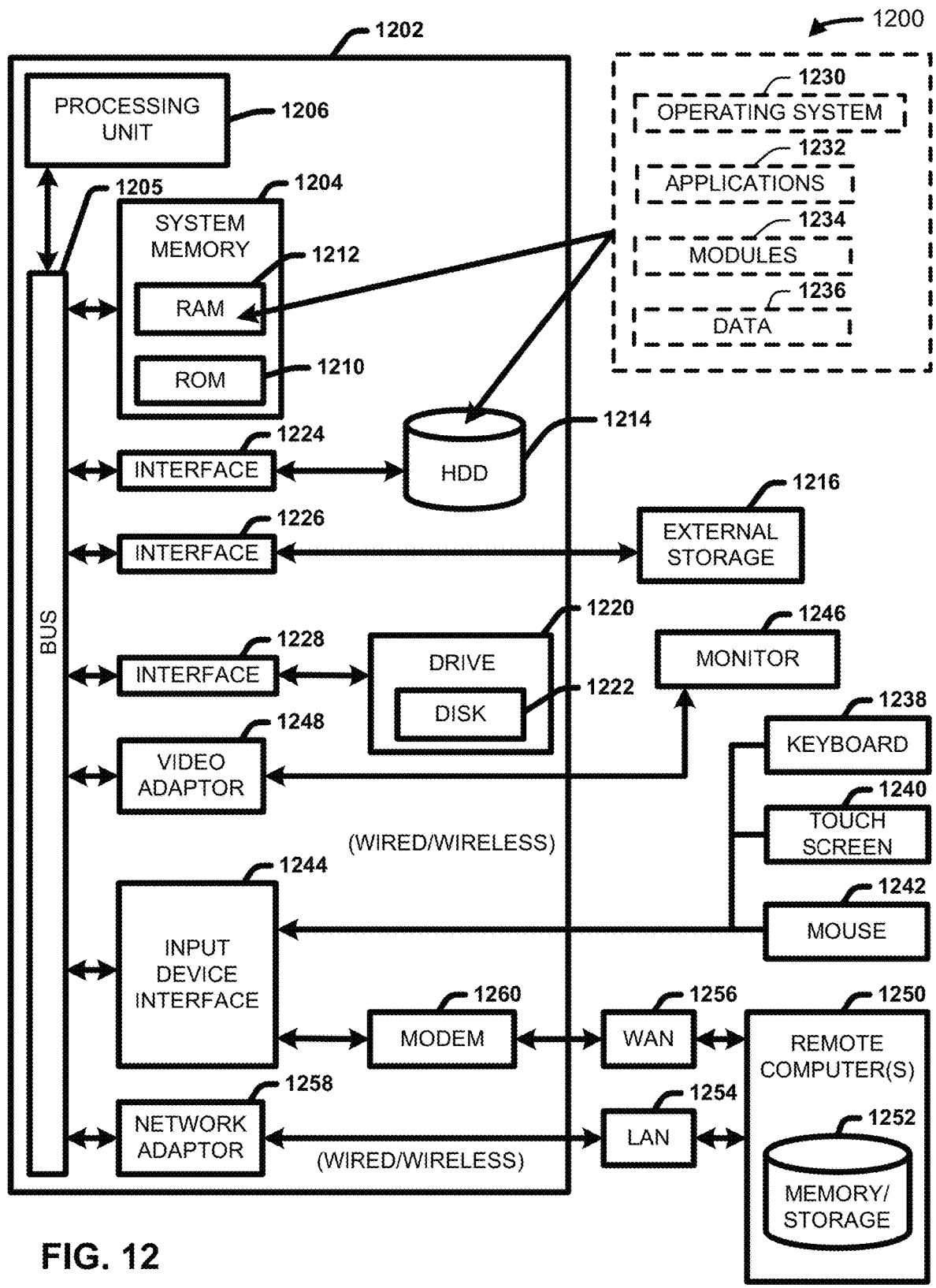
FIG. 12 illustrates a block diagram of an example, non-limiting operating environment, in which one or more embodiments described herein can be facilitated.
Figure 13:
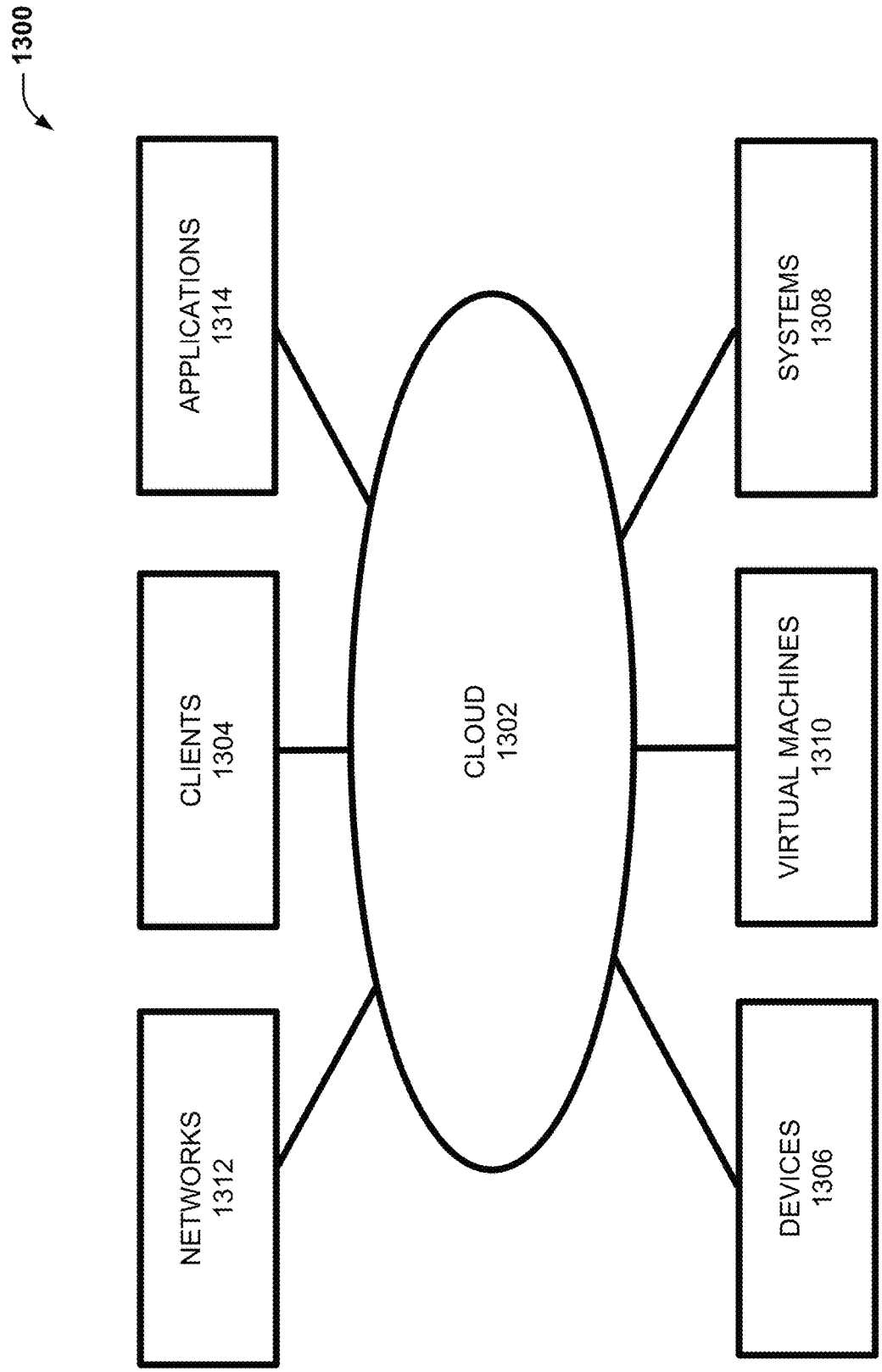
FIG. 13 illustrates a block diagram of an example, non-limiting cloud computing environment, in accordance with one or more embodiments described herein.

Turning next to FIGS. 12 and 13, a detailed description is provided of additional context for the one or more embodiments described herein at FIGS. 1-11.

FIG. 12 and the following discussion are intended to provide a brief, general description of a suitable operating environment 1200 in which one or more embodiments described herein at FIGS. 1-11 can be implemented. For example, one or more components and/or other aspects of embodiments described herein can be implemented in or be associated with, such as accessible via, the operating environment 1200. Further, while one or more embodiments have been described above in the general context of computer-executable instructions that can run on one or more computers, those skilled in the art will recognize that one or more embodiments also can be implemented at least partially in parallel with other program modules and/or as a combination of hardware and software.

Generally, program modules include routines, programs, components and/or data structures that perform tasks and/or implement abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, and/or microprocessor-based or programmable consumer electronics, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 12, the example operating environment 1200 for implementing one or more embodiments of the aspects described herein can include a computer 1202, the computer 1202 including a processing unit 1206, a system memory 1204 and/or a system bus 1205. One or more aspects of the processing unit 1206 can be applied to processors such as 706 and/or 806 of the non-limiting systems 700 and/or 800. The processing unit 1206 can be implemented at least partially in parallel with and/or alternatively to processors such as 706 and/or 806.

Memory 1204 can store one or more computer and/or machine readable, writable and/or executable components and/or instructions that, when executed by processing unit 1206 (e.g., a classical processor, and/or like processor), can provide performance of operations defined by the executable component and/or instruction. For example, memory 1204 can store computer and/or machine readable, writable, and/or executable components and/or instructions that, when executed by processing unit 1206, can provide execution of the one or more functions described herein relating to non-limiting system 700 and/or non-limiting system 800, as described herein with or without reference to the one or more figures of the one or more embodiments.

Memory 1204 can comprise volatile memory (e.g., random access memory (RAM), static RAM (SRAM) and/or dynamic RAM (DRAM)) and/or non-volatile memory (e.g., read only memory (ROM), programmable ROM (PROM), electrically programmable ROM (EPROM) and/or electrically erasable programmable ROM (EEPROM)) that can employ one or more memory architectures.

Processing unit 1206 can comprise one or more types of processors and/or electronic circuitry (e.g., a classical processor and/or like processor) that can implement one or more computer and/or machine readable, writable and/or executable components and/or instructions that can be stored at memory 1204. For example, processing unit 1206 can perform one or more operations that can be specified by computer and/or machine readable, writable, and/or executable components and/or instructions including, but not limited to, logic, control, input/output (I/O) and/or arithmetic. In one or more embodiments, processing unit 1206 can be any of one or more commercially available processors. In one or more embodiments, processing unit 1206 can comprise one or more central processing unit, multi-core processor, microprocessor, dual microprocessors, microcontroller, System on a Chip (SOC), array processor, vector processor, and/or another type of processor. The examples of processing unit 1206 can be employed to implement one or more embodiments described herein.

The system bus 1205 can couple system components including, but not limited to, the system memory 1204 to the processing unit 1206. The system bus 1205 can comprise one or more types of bus structure that can further interconnect to a memory bus (with or without a memory controller), a peripheral bus, and/or a local bus using one or more of a variety of commercially available bus architectures. The system memory 1204 can include ROM 1210 and/or RAM 1212. A basic input/output system (BIOS) can be stored in a non-volatile memory such as ROM, erasable programmable read only memory (EPROM) and/or EEPROM, which BIOS contains the basic routines that help to transfer information among elements within the computer 1202, such as during startup. The RAM 1212 can include a high-speed RAM, such as static RAM for caching data.

The computer 1202 can include an internal hard disk drive (HDD) 1214 (e.g., EIDE, SATA), one or more external storage devices 1216 (e.g., a magnetic floppy disk drive (FDD), a memory stick or flash drive reader and/or a memory card reader) and/or a drive 1220, e.g., such as a solid state drive or an optical disk drive, which can read or write from a disk 1222, such as a CD-ROM disc, a DVD and/or a BD. Additionally, and/or alternatively, where a solid state drive is involved, disk 1222 could not be included, unless separate. While the internal HDD 1214 is illustrated as located within the computer 1202, the internal HDD 1214 can also be configured for external use in a suitable chassis (not shown). Additionally, while not shown in operating environment 1200, a solid state drive (SSD) can be used in addition to, or in place of, an HDD 1214. The HDD 1214, external storage device 1216 and drive 1220 can be connected to the system bus 1205 by an HDD interface 1224, an external storage interface 1226 and a drive interface 1228, respectively. The HDD interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1212, including an operating system 1230, one or more applications 1232, other program modules 1234 and/or program data 1236. All or portions of the operating system, applications, modules, and/or data can also be cached in the RAM 1212. The systems and/or methods described herein can be implemented utilizing one or more commercially available operating systems and/or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In a related embodiment, operating system 1230 can comprise one virtual machine (VM) of multiple VMs hosted at computer 1202. Furthermore, operating system 1230 can provide runtime environments, such as the JAVA runtime environment or the .NET framework, for applications 1232. Runtime environments are consistent execution environments that can allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and/or settings for an application.

Further, computer 1202 can be enabled with a security module, such as a trusted processing module (TPM). For instance, with a TPM, boot components hash next in time boot components and wait for a match of results to secured values before loading a next boot component. This process can take place at any layer in the code execution stack of computer 1202, e.g., applied at application execution level and/or at operating system (OS) kernel level, thereby enabling security at any level of code execution.

An entity can enter and/or transmit commands and/or information into the computer 1202 through one or more wired/wireless input devices, e.g., a keyboard 1238, a touch screen 1240 and/or a pointing device, such as a mouse 1242. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera, a gesture sensor input device, a vision movement sensor input device, an emotion or facial detection device and/or a biometric input device, e.g., fingerprint and/or iris scanner. These and other input devices can be connected to the processing unit 1206 through an input device interface 1244 that can be coupled to the system bus 1205, but can be connected by other interfaces, such as a parallel port, an IEEE 1394 serial port, a game port, a USB port, an IR interface and/or a BLUETOOTH® interface.

A monitor 1246 or other type of display device can be alternatively and/or additionally connected to the system bus 1205 via an interface, such as a video adapter 1248. In addition to the monitor 1246, a computer typically includes other peripheral output devices (not shown), such as speakers and/or printers.

The computer 1202 can operate in a networked environment using logical connections via wired and/or wireless communications to one or more remote computers, such as a remote computer 1250. The remote computer 1250 can be a workstation, a server computer, a router, a personal computer, portable computer, microprocessor-based entertainment appliance, a peer device and/or other common network node, and typically includes many or all of the elements described relative to the computer 1202, although, for purposes of brevity, only a memory/storage device 1252 is illustrated. Additionally, and/or alternatively, the computer 1202 can be coupled (e.g., communicatively, electrically, operatively and/or optically) to one or more external systems, sources, and/or devices (e.g., computing devices, communication devices and/or like device) via a data cable (e.g., High-Definition Multimedia Interface (HDMI), recommended standard (RS) 232 and/or Ethernet cable).

In one or more embodiments, a network can comprise one or more wired and/or wireless networks, including, but not limited to, a cellular network, a wide area network (WAN) (e.g., the Internet) or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver and/or a decoder), software (e.g., a set of threads, a set of processes and/or software in execution) and/or a combination of hardware and/or software that provides communicating information among one or more embodiments described herein and external systems, sources, and/or devices (e.g., computing devices and/or communication devices).

The logical connections depicted include wired/wireless connectivity to a local area network (LAN) 1254 and/or larger networks, e.g., a wide area network (WAN) 1256. LAN and WAN networking environments can be commonplace in offices and companies and can provide enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can provide wired and/or wireless communication to the LAN 1254, which can also include a wireless access point (AP) disposed thereon for communicating with the adapter 1258 in a wireless mode.

When used in a WAN networking environment, the computer 1202 can include a modem 1260 and/or can be connected to a communications server on the WAN 1256 via other means for establishing communications over the WAN 1256, such as by way of the Internet. The modem 1260, which can be internal and/or external and a wired and/or wireless device, can be connected to the system bus 1205 via the input device interface 1244. In a networked environment, program modules depicted relative to the computer 1202 or portions thereof can be stored in the remote memory/storage device 1252. The network connections shown are merely exemplary and one or more other means of establishing a communications link among the computers can be used.

When used in either a LAN or WAN networking environment, the computer 1202 can access cloud storage systems or other network-based storage systems in addition to, and/or in place of, external storage devices 1216 as described above, such as but not limited to, a network virtual machine providing one or more aspects of storage and/or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, such as with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand and/or store shelf). This can include Wireless Fidelity (Wi-Fi) and BLUETOOTH® wireless technologies. Thus, the communication can be a defined structure as with a conventional network or simply an ad hoc communication between at least two devices.

The illustrated embodiments described herein can be employed relative to distributed computing environments (e.g., cloud computing environments), such as described below with respect to FIG. 13, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1302 described below with reference to illustration 1300 of FIG. 13. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems 700 and/or 800, and/or the example operating environment 1200 of FIG. 12, can be associated with and/or be included in cloud-based and/or partially-cloud-based system.

Referring now to details of one or more elements illustrated at FIG. 13, the illustrative cloud computing environment 1302 is depicted. Cloud computing environment 1302 can comprise one or more cloud computing nodes and/or virtual machines with which local computing devices used by cloud clients 1304, such as for example via one or more devices 1306, systems 1308, virtual machines 1310, networks 1312, and/or applications 1314.

The one or more cloud computing nodes and/or virtual machines can be grouped physically or virtually, in one or more networks, such as local, distributed, private, public clouds, and/or a combination thereof. The cloud computing environment 1302 can provide infrastructure, platforms, virtual machines, and/or software for which a client 1304 does not maintain all or at least a portion of resources on a local device, such as a computing device. The various elements 1306 to 1312 are not intended to be limiting and are but some of various examples of computerized elements that can communicate with one another and/or with the one or more cloud computing nodes via the cloud computing environment 1302, such as over any suitable network connection and/or type.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a defined manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform tasks and/or implement particular data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on standalone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory that stores computer executable components; and
a processor that executes the computer executable components stored in the memory, wherein the computer executable components are executable to perform operations, the operations comprising:
identifying, based on a comparison of a metric to a historical metric for vehicle performance, a current event that is defined by the metric as leading to degradation of a plurality of battery cells of a vehicle system;
upon identifying the current event, determining a first subset of the plurality of battery cells that is beyond a threshold for remediation;
continuing to use the first subset of the plurality of battery cells such that the first subset of the plurality of battery cells degrades towards end of life of the first subset of the plurality of battery cells;
identifying a second subset of the plurality of battery cells that is not beyond the threshold for remediation; and
ceasing to use the second subset of the plurality of battery cells such that the second subset of the plurality of battery cells is not degraded towards end of life of the second subset of the plurality of battery cells.

2. The system of claim 1, wherein the operations further comprise:
comparing the metric to the historical metric by employing an artificial intelligence model.

3. The system of claim 1, wherein the metric defining the current event is obtained from the system or from a source external to the system.

4. The system of claim 3, wherein the metric obtained from the source comprises weather data, communication data, or personal data of a user employing the system.

5. The system of claim 1, wherein the historical metric is related to performance of the vehicle or of a second vehicle.

6. The system of claim 1, wherein continuing to use the first subset of the plurality of battery cells comprises continuing to discharge the first subset of the plurality of battery cells or continuing to charge the first subset of the plurality of battery cells.

7. The system of claim 1, wherein the operations further comprise:
identifying the first subset of the plurality of battery cells further based on a specified threshold, wherein a state of health of the first subset of the plurality of battery cells satisfies the specified threshold.

8. The system of claim 7, wherein the specified threshold is further defined by vehicle performance, subset performance, battery warranty, or subset replacement cost.

9. A method, comprising:
identifying, by a system operatively coupled to a processor, based on a comparison of a metric to a historical metric for vehicle performance, a current event that is defined by the metric as leading to degradation of a plurality of battery cells of a vehicle system;
upon identifying the current event, determining, by the system, a first subset of the plurality of battery cells that is beyond a threshold for remediation;
continuing to use, by the system, the first subset of the plurality of battery cells such that the first subset of the plurality of battery cells degrades towards end of life of the first subset of the plurality of battery cells;
identifying, by the system, a second subset of the plurality of battery cells that is not beyond the threshold for remediation; and
ceasing to use, by the system, the second subset of the plurality of battery cells such that the second subset of the plurality of battery cells is not degraded towards end of life of the second subset of the plurality of battery cells.

10. The method of claim 9, further comprising:
comparing, by the system, the metric to the historical metric by employing an artificial intelligence model.

11. The method of claim 9, wherein the metric defining the current event is obtained from the system or from a source external to the system.

12. The method of claim 11, wherein the metric obtained from the source comprises weather data, communication data, or personal data of a user employing the system.

13. The method of claim 9, wherein continuing to use the first subset of the plurality of battery cells comprises continuing to discharge the first subset of the plurality of battery cells or continuing to charge the first subset of the plurality of battery cells.

14. The method of claim 9, further comprising:
identifying, by the system, the first subset of the plurality of battery cells further based on a specified threshold, wherein a state of health of the first subset of the plurality of battery cells satisfies the specified threshold.

15. A non-transitory machine-readable medium, comprising executable instructions that, when executed by a processor, facilitate performance of operations, the operations comprising:
identifying, by the processor, based on a comparison of a metric to a historical metric for vehicle performance, a current event that is defined by the metric as leading to degradation of a plurality of battery cells of a vehicle system;
upon identifying the current event, determining, by the processor, a first subset of the plurality of battery cells that is beyond a threshold for remediation;
continuing to use, by the processor, the first subset of the plurality of battery cells such that the first subset of the plurality of battery cells degrades towards end of life of the first subset of the plurality of battery cells;
identifying, by the processor, a second subset of the plurality of battery cells that is not beyond the threshold for remediation; and
ceasing to use, by the processor, the second subset of the plurality of battery cells such that the second subset of the plurality of battery cells is not degraded towards end of life of the second subset of the plurality of battery cells.

16. The non-transitory machine-readable medium of claim 15, wherein the operations further comprise:
comparing, by the processor, the metric to the historical metric by employing an artificial intelligence model.

17. The non-transitory machine-readable medium of claim 15, wherein the metric defining the current event is obtained from a source external to the vehicle system, and wherein the metric obtained from the source comprises weather data, communication data, or personal data of a user employing the vehicle system.

18. The non-transitory machine-readable medium of claim 15, wherein continuing to use the first subset of the plurality of battery cells comprises continuing to discharge the first subset of the plurality of battery cells or continuing to charge the first subset of the plurality of battery cells.

19. The non-transitory machine-readable medium of claim 15, wherein the operations further comprise:
identifying, by the processor, the first subset of the plurality of battery cells further based on a specified threshold, wherein a state of health of the subset of the plurality of battery cells satisfies the specified threshold.

20. The non-transitory machine-readable medium of claim 19, wherein the specified threshold is further defined by vehicle performance, subset performance, battery warranty, or subset replacement cost.

* * * * *